May 28, 1940.  R. J. STEWART ET AL  2,202,033
FILLING MACHINE
Original Filed Aug. 14, 1934   13 Sheets-Sheet 4
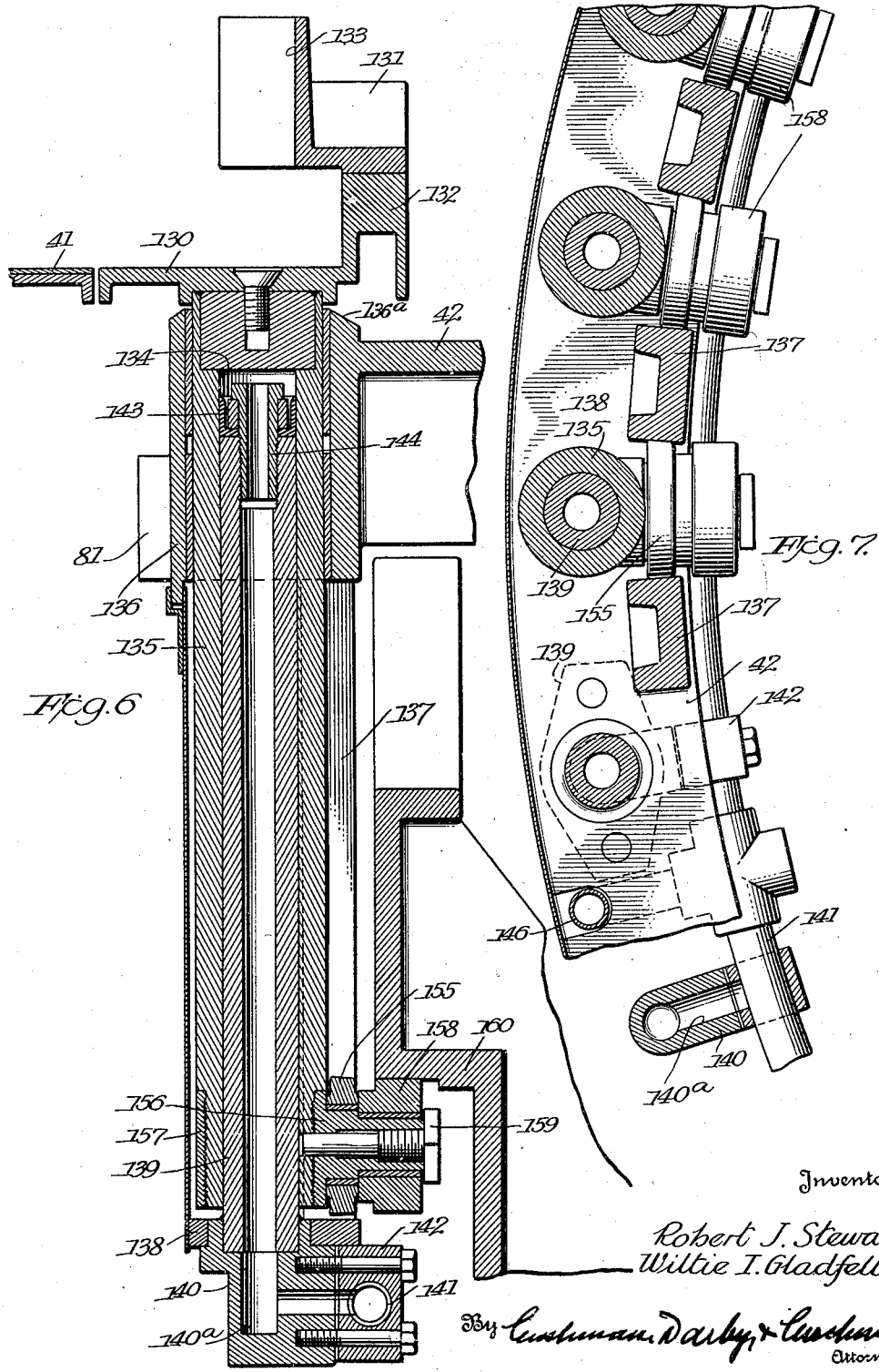

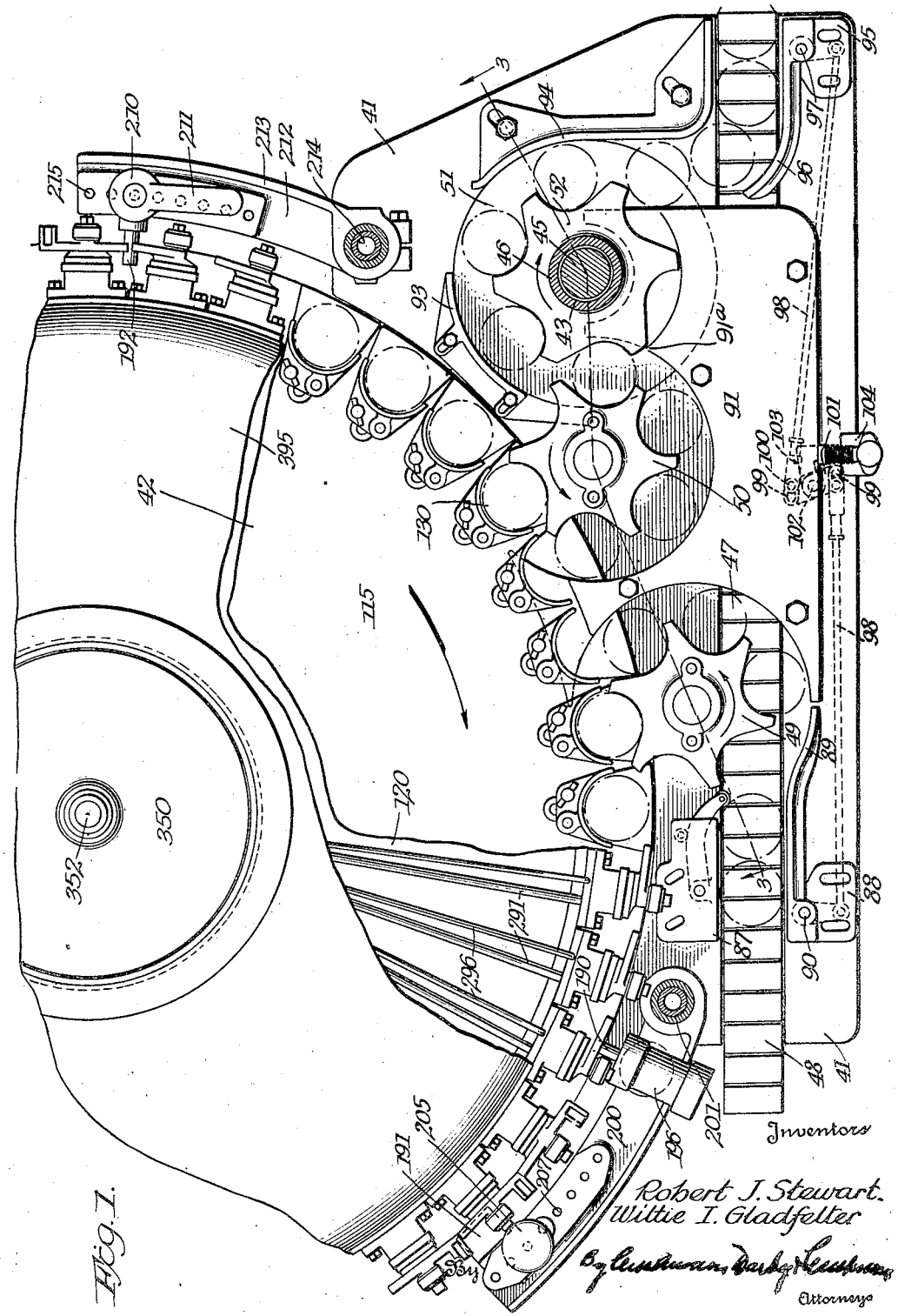

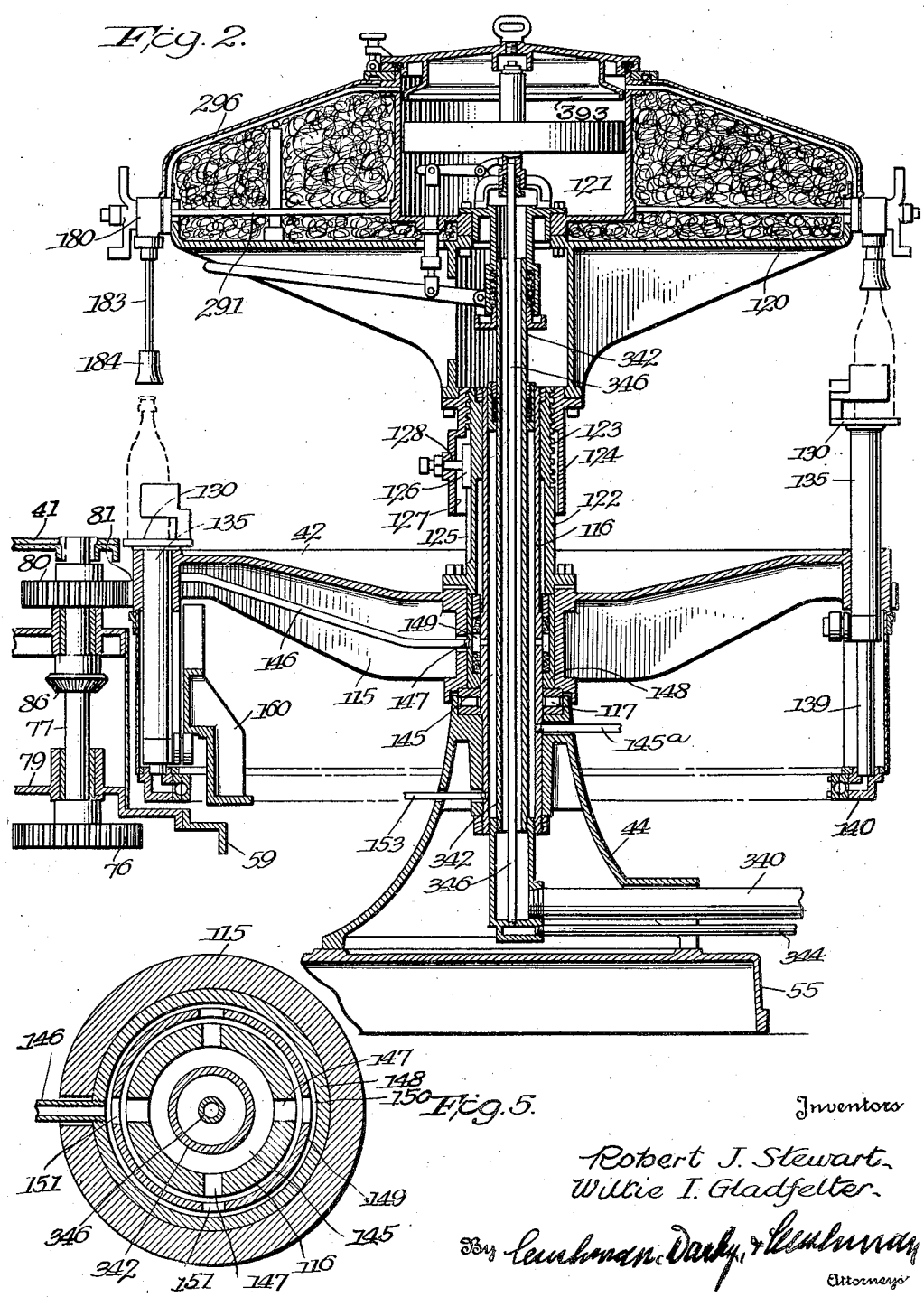

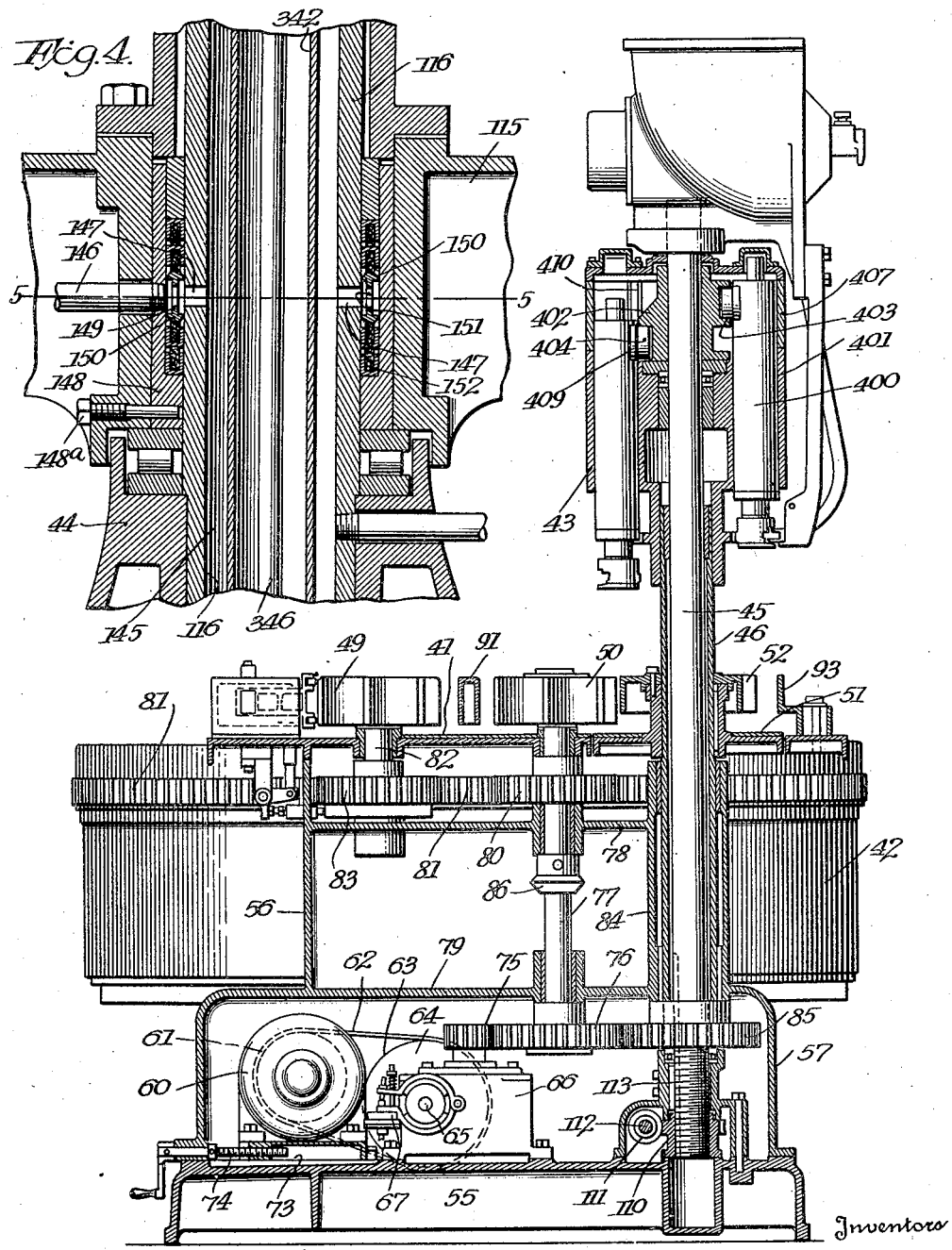

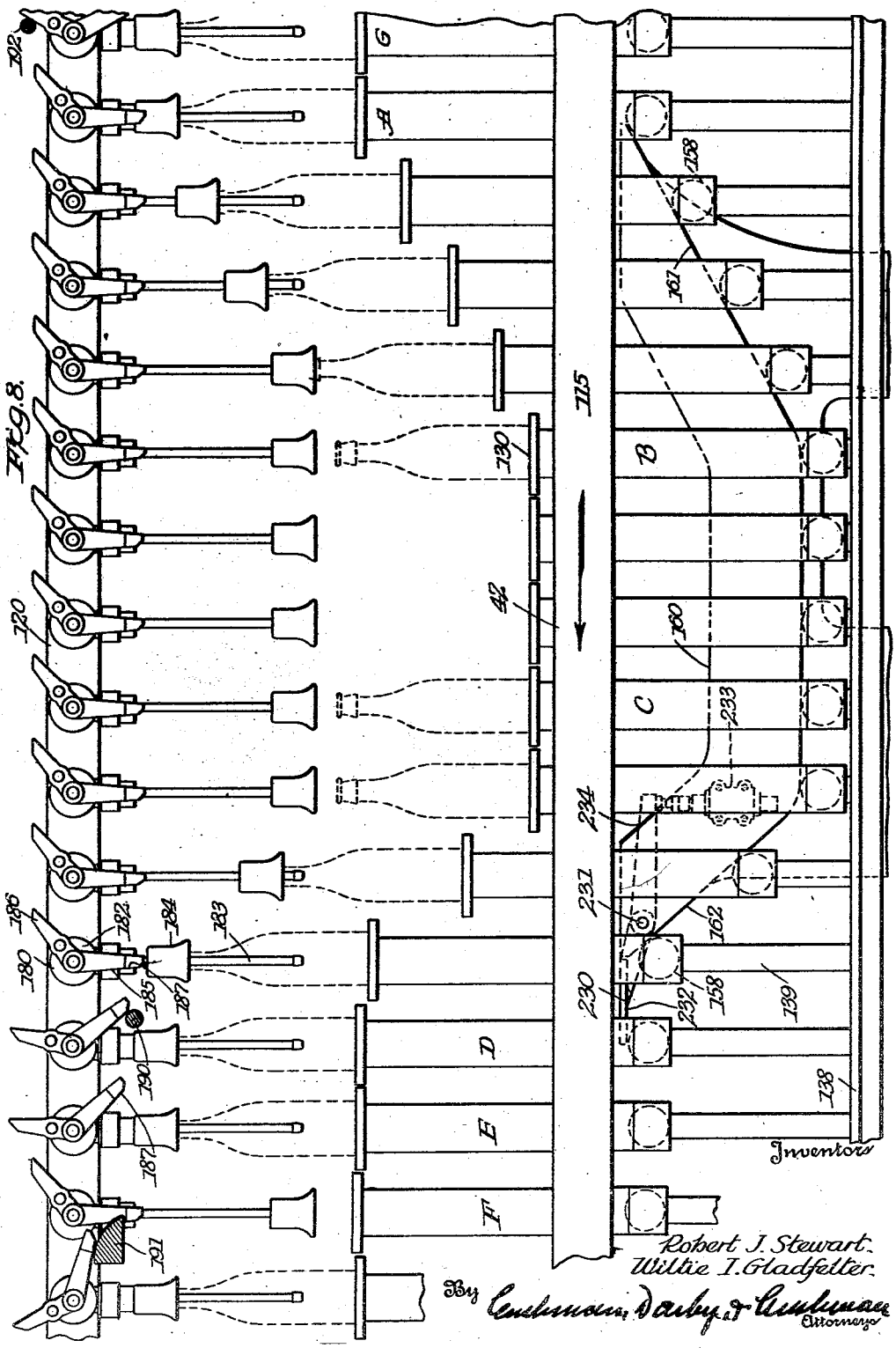

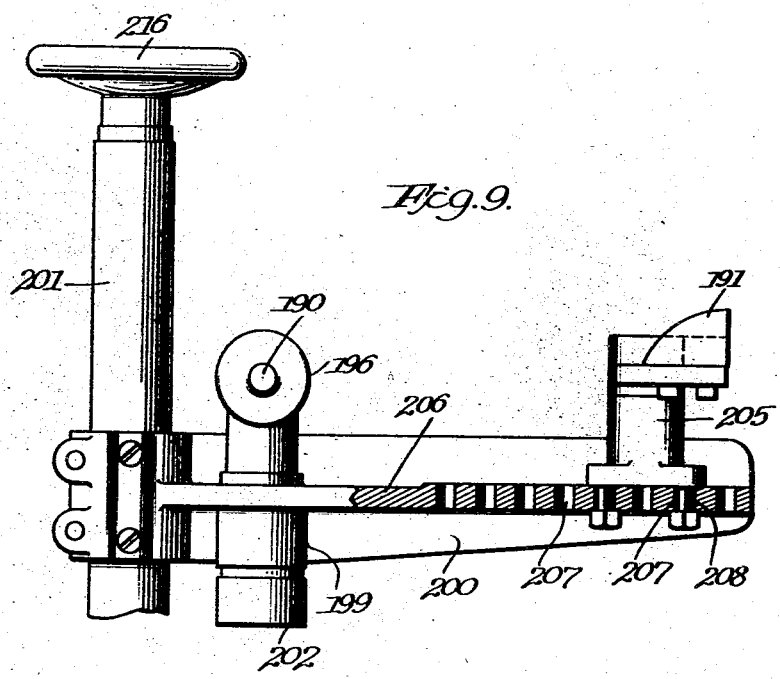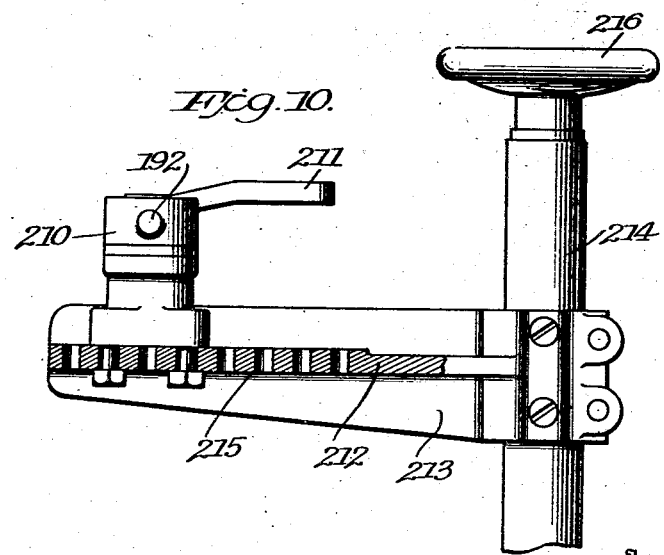

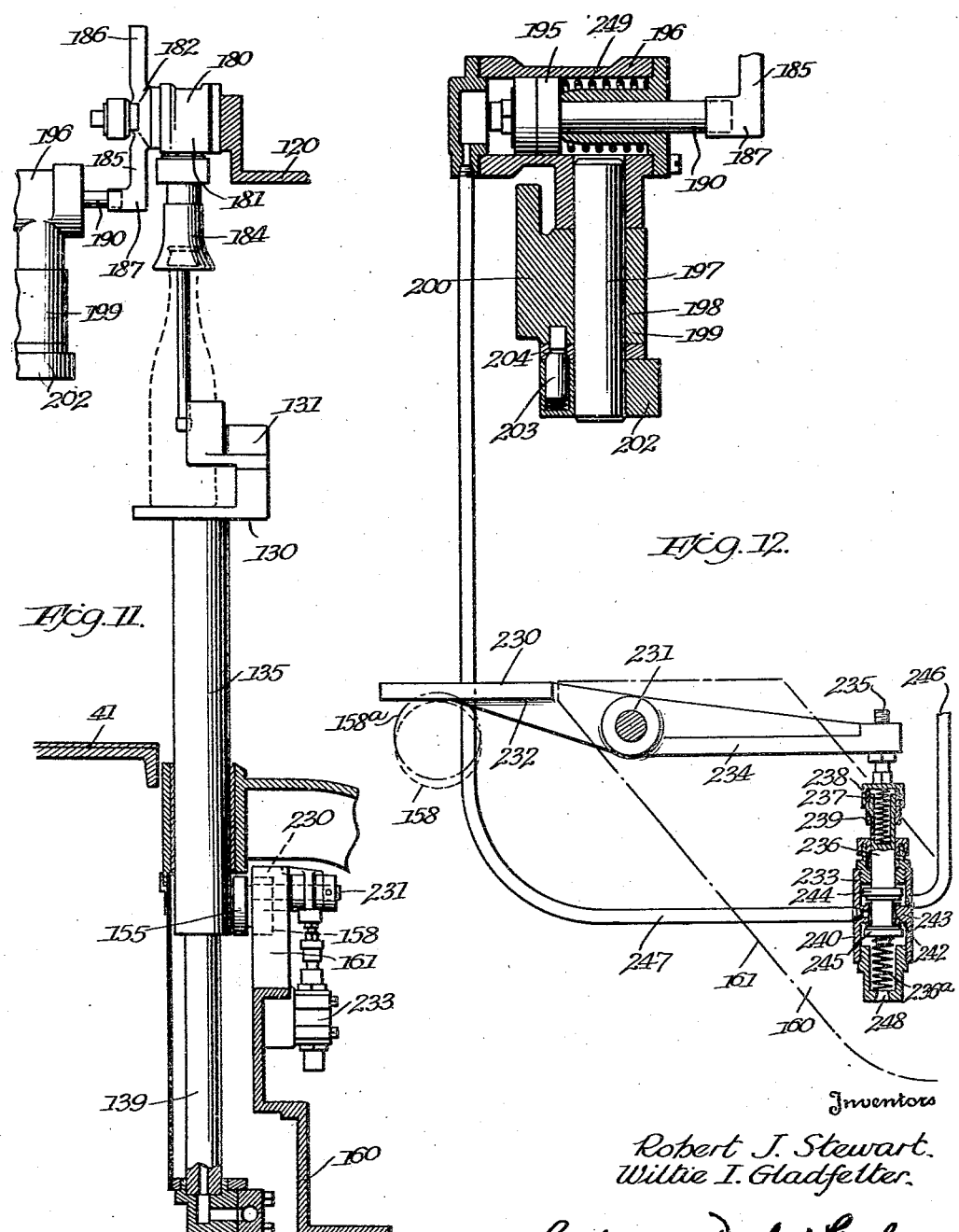

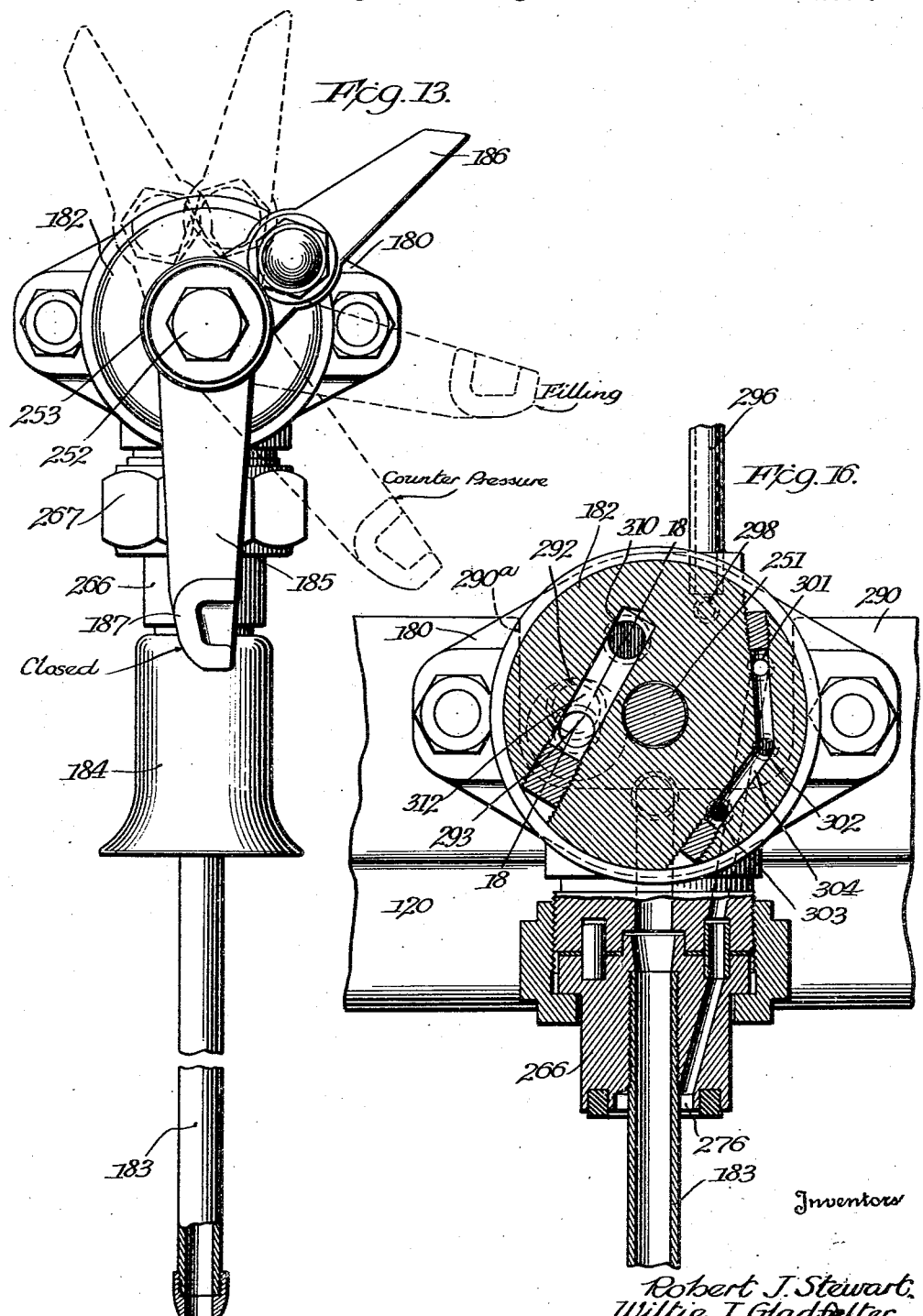

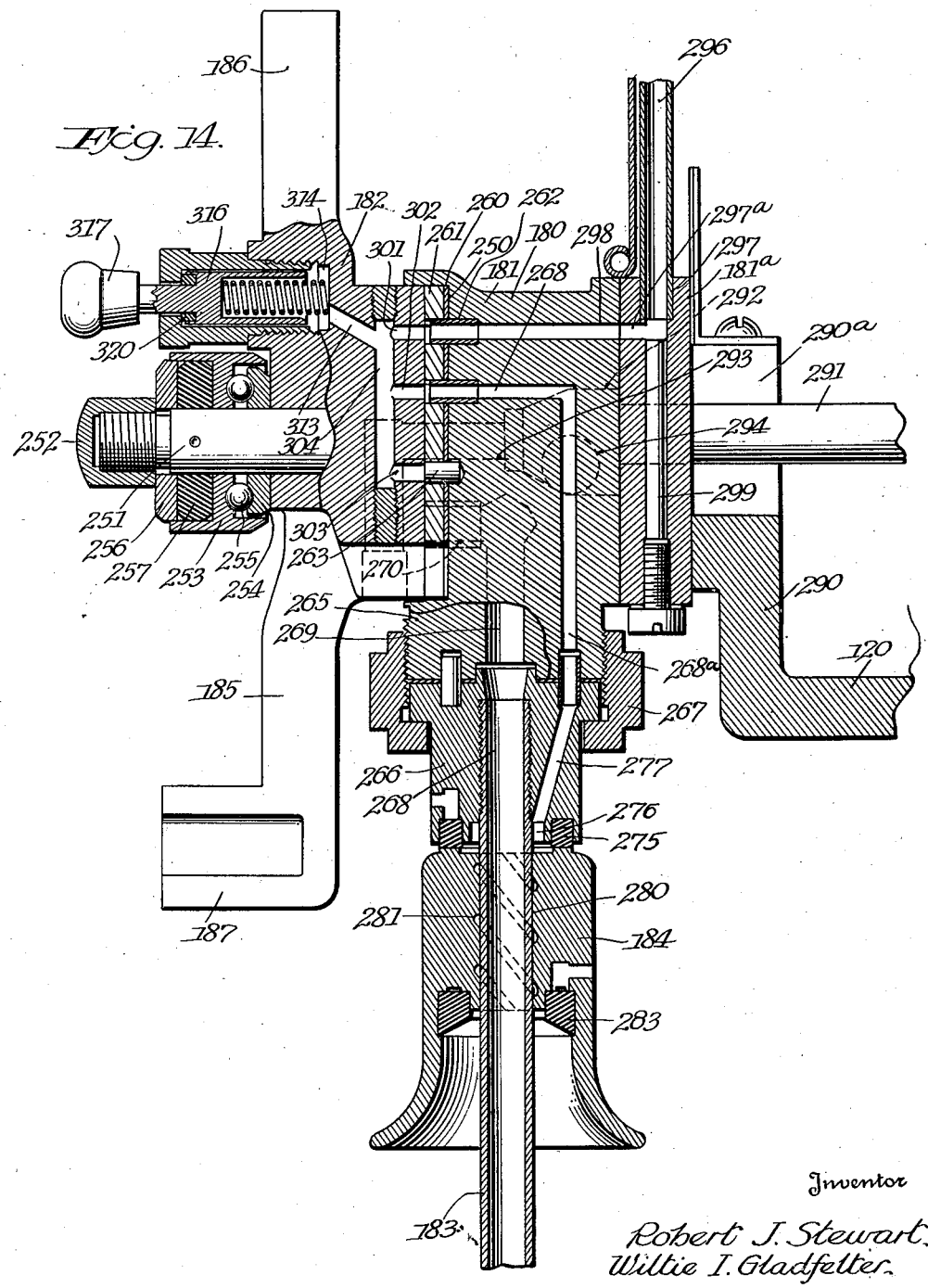

May 28, 1940. R. J. STEWART ET AL 2,202,033
FILLING MACHINE
Original Filed Aug. 14, 1934 13 Sheets-Sheet 10
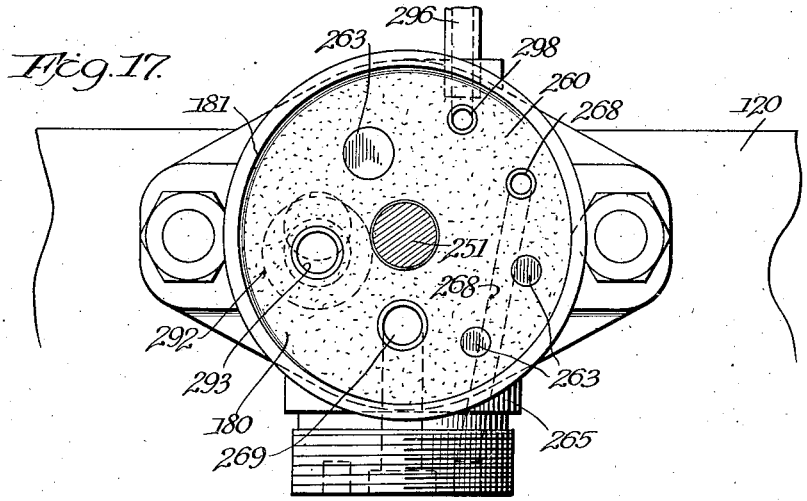
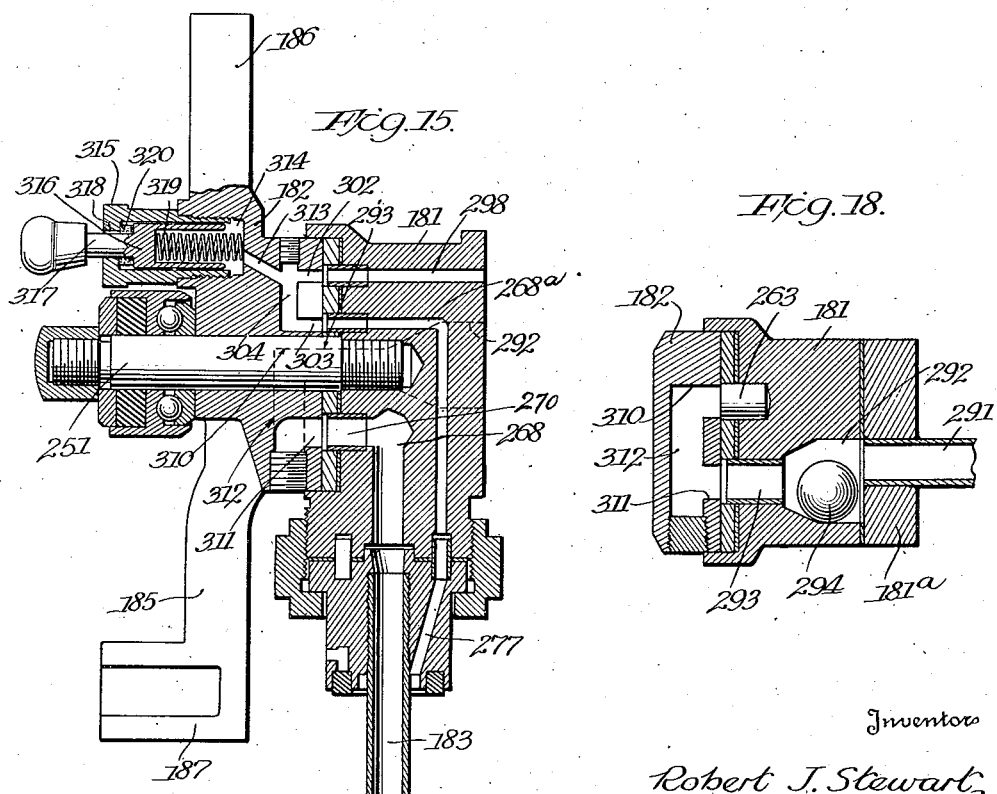
Inventors
Robert J. Stewart
Willie I. Gladfelter
By Cushman, Darby, & Cushman
Attorneys May 28, 1940.　　R. J. STEWART ET AL　　2,202,033
FILLING MACHINE
Original Filed Aug. 14, 1934　　13 Sheets-Sheet 11

Inventors
Robert J. Stewart.
Willie I. Gladfelter.
By Cushman, Darby & Cushman
Attorneys May 28, 1940.　　　R. J. STEWART ET AL　　　2,202,033
FILLING MACHINE
Original Filed Aug. 14, 1934　　13 Sheets-Sheet 13

Inventors
Robert J. Stewart
Wiltie I. Gladfelter

By Cushman, Darby & Cushman
Attorneys

Patented May 28, 1940

2,202,033

UNITED STATES PATENT OFFICE 2,202,033

FILLING MACHINE

Robert J. Stewart and Wiltie I. Gladfelter, Baltimore, Md., assignors to Crown Cork & Seal Company, Inc., Baltimore, Md., a corporation of New York Original application August 14, 1934, Serial No. 739,818. Divided and this application February 27, 1937, Serial No. 128,300

20 Claims. (Cl. 226—98)

The present invention relates to filling machines and, more particularly, to a machine for bottling beer, the present application being a division of our application for a Filling machine, Serial No. 739,818, filed August 14, 1934.

An important object of the invention is to provide an improved lifting mechanism for moving the bottle supporting platforms and the bottles carried thereby to the filling heads.

Bottling machines ordinarily include a rotary filling table which is provided with a plurality of bottle supporting platforms. The filling table rotates adjacent a stationary work table and during the movement of the filling table past the stationary table, bottles are moved upon the bottle supporting platforms and into alignment with the filling nozzle provided above each filling platform. Immediately thereafter, the bottle platform is raised so that the bottle will surround the filling nozzle and will come into contact with the undersurface of the filling head of that nozzle. The arrangement generally used to raise a bottle supporting platform comprises a coil spring. During the movement of a bottle platform adjacent the stationary table, this coil spring is contracted by the engagement of a roller or the like with a stationary cam, this engagement causing the bottle platform to be moved downwardly so that its upper surface will be flush with the surface of the stationary table. When the bottle platform moves away from the stationary table, as described above, the roller upon the platform moves out of engagement with the cam track and the spring expands to move the platform upwardly.

A very important difficulty which results from the use of a coil spring to control the position of the bottling platforms is that the coil spring naturally exerts less pressure at its stage of greatest expansion, yet, at this stage, the coil spring must exert sufficient expansive force to firmly hold the mouth of the bottle in contact with the underside of the filling head. Assuming that the spring is of such design as to be capable of exerting this pressure, it results that when the spring is contracted to hold the bottle platform in the downward position which it occupies when moving adjacent the stationary table, a tremendous force will then be exerted by the spring. It naturally follows that the very considerable resistance of the spring toward movement to a compressed or retracted position will tend to retard rotation of the filling table. That is to say, when the roller of a bottle platform first comes into contact with the cam track which causes it to be moved downwardly, the rotary movement of the filling table will be opposed by the resistance of the vertically extending spring to compression by the downward movement of the roller. This necessitates that the motor used to operate the filling machine be of sufficient horsepower to overcome the retarding effect of the bottle platform springs.

In order to meet the requirements of the bottling trade, it is necessary that filling machines be so designed that they may be used to fill bottles of all standard sizes. When bottles of larger sizes are being filled, the bottle platforms must naturally move a greater distance to position the mouth of the bottle against the filling head and the coil spring which moves the bottle platform upwardly is therefore expanded to a much greater extent than it is when a smaller bottle is positioned upon the platform. This is due to the fact that the filling nozzle in every instance should reach almost to the bottom of a bottle and filling nozzles of different lengths must be used according to the size of the bottle being filled. A larger bottle must therefore move downwardly to a lower position to clear the lower end of the nozzle and must move upwardly a greater distance to engage the upper end of the nozzle. Smaller bottles, on the other hand, need only move a distance necessary to clear and engage a correspondingly shorter nozzle. Since the spring is not fully expanded when operating with small bottles, it of course exerts more force to hold such a bottle against the filling head than it exerts to hold a larger bottle in position. Nevertheless, the spring must exert sufficient force to hold a larger bottle tightly in contact with the filling head and, if the spring is capable, at its point of greatest operative expansion, to exert such force, the force exerted by the spring when in entirely retracted position is very substantial. Due to difficulties arising in the manufacture of coil springs, some may not entirely meet the requirements discussed above, and if the spring is not of sufficient strength to hold the bottle in sealed contact with a filling head, the contents of that bottle are naturally not of proper strength.

An important object of the present invention is to provide a mechanism for lifting the bottle supporting platforms of filling machines, which mechanism will exert a uniform and proper upward pressure upon each platform and which may be operated to move a platform to retracted position without any substantial resistance to rotary movement of the filling table.

In its preferred embodiment, the lifting mechanism of the present invention is fluid-operated and includes a means for maintaining pressure in a chamber provided beneath or in each bottle supporting platform so that the platforms will normally be held in an upward position. The platforms are moved to downward position by the action of a cam or other engaging means with which the platforms contact when moving adjacent the fixed table of the machine to have filled bottles removed therefrom and replaced by unfilled bottles. All of the chambers beneath the bottle platforms are constantly in communication with a fluid pressure circuit and it therefore results that when one platform is moved downwardly by reason of its engagement with the cam, the fluid in its chamber will be distributed in the circuit to raise a platform which is at that moment moving out of engagement with the cam track and away from the stationary table.

An advantage resulting from the use of fluid-operated platforms is that the pressure maintained in the circuit of the system may be varied, to suit filling pressure conditions.

It has heretofore been proposed to operate the bottle supporting platforms of filling machines by fluid pressure, but these prior arrangements have been expensive to manufacture since they have included a great number of valve parts. In one form of a prior fluid-operated platform lifting mechanism, each platform is raised by fluid pressure acting upon one side of a piston fixed to the platform, the platform being lowered by fluid pressure acting upon the opposite side of the piston. The fluid supplied to one side of the piston to move it in one direction is exhausted at the conclusion of that stroke of the piston so that the piston may then be moved by the pressure supplied to the opposite side. In some instances, this type of platform lifting means has the fluid pressure supply controlled by the filling valve aligned with each platform. This arrangement has been unsatisfactory because the lubricant contained in the platform lifting fluid supply passages works between the faces of the filling valve and into the beer passages of the filling valve, resulting in contamination of the beer. In any event, the provision of a fluid-operated system in which the fluid is exhausted at each end of a piston stroke results in a considerable expense in the operation of the machine. Also, since valves must be provided for each platform, such systems include a great number of working parts which are entirely eliminated by the arrangement of the present invention.

In another prior form of fluid-operated platform lifting mechanism, the platform is moved upwardly by the fluid pressure, this fluid pressure being exhausted when the platform moves adjacent the stationary table so that the platform will drop by gravity. A serious difficulty of this type of mechanism results from the fact that it is possible, in such a mechanism, for beer to seep into the cylinder in which the piston moves, forming a gummy substance which seriously interferes with the movement of the piston. This difficulty is naturally particularly serious in a construction wherein the piston and platform are intended to drop by gravity.

In the present invention, each platform preferably includes a depending sleeve which entirely encloses and covers the upper end of the fluid chamber so that any beer which leaks from the filling heads will merely flow down about the outer wall of the sleeve and cannot reach the space between the sleeve of the platform and the surface on which it moves.

Still another object of the invention is to provide a filling head which is so constructed that there will be a minimum possibility of foaming of the beer during the filling operation.

In the operation of filling bottles with beer by a filling machine, it is usual to first move the filling valve to "counter-pressure" position wherein the interior of the bottle will be in communication with the counter-pressure air in the upper portion of the filling tank so that the pressure in the bottle will be the same as the pressure in the tank. The filling valve is then moved to "filling" position to permit the beer in the tank to flow into the bottle, the filling valve, at the same time, establishing communication between the bottle and the upper portion of the filling tank so that the counter-pressure air in the bottle may return to the filling tank. The valve is subsequently moved to a third position, "neutral" or closed position, in which the bottle will be entirely out of communication with the filling tank and, when the valve has been moved to this position, the filling nozzle will be removed from the bottle and the latter opened to atmosphere.

Valve trips are spaced about the path of travel of the filling table to successively operate the filling valves to the three positions referred to above. These trips are usually so arranged with respect to the path of travel of the filling table and the bottles carried thereby that the filling of the bottle with beer will terminate at substantially the same moment that the filling valve engages the neutral trip. The principal purpose of this arrangement is to prevent too great a quantity of beer from flowing to the bottle, since any amount of beer above the capacity of the bottle will flow upwardly in the relief passage through which air is exhausted from the bottle to the filling tank during the filling stage, unless the filling valve is moved to neutral or closed position at the instant that the bottle has been completely filled.

However, in actual practice, due to extremely slight differences in the shapes and sizes of the flow passages, beer flows through some of the passages and filling heads more rapidly than through others. As a result, beer will flow to some of the bottles at a somewhat more rapid rate than to other bottles and since it is necessary to have the neutral trip positioned at the point at which it will properly cooperate with the filling head through which the slowest flow occurs, in order that the bottle beneath that head will be entirely filled, the bottle beneath a filling head through which more rapid flow occurs will receive a supply of beer for a longer period of time than is actually necessary. The bottles beneath the filling heads through which beer flows most rapidly will therefore receive a quantity of beer in excess of their capacity, the surplus moving upwardly into the counter-pressure relief passage. Also, all bottles, even of a given size, do not have identical capacities, and if a particular bottle is of a capacity less than standard, surplus beer will flow from that bottle upwardly into the counter-pressure relief passage. The beer which flows upwardly into the counter-pressure relief passage during the filling stage will be retained in that passage by the subsequent movement of the filling valve to neutral or closed position, and, after the filled bottle has been removed, this beer will flow down into the empty bottle which is subsequently placed under the filling head of that passage when the filling valve is moved to a position to establish counter-pressure in the new bottle.

In the filling heads heretofore provided, any surplus beer which may be present in the counter-pressure passage of a filling head is ejected from that passage with some force and since the counter-pressure passage usually terminates at the mouth of the bottle, the ejected beer falls the entire length of the bottle. The impact of this beer with the bottle is very apt to cause it to foam and when additional beer is flowed into the bottle, during the immediately subsequent filling stage, the foaming may continue, preventing the bottle from being properly filled.

The mouths or outlets of the filling head counter-pressure passages provided by the present invention are so arranged that any surplus beer ejected from the passages will move downwardly, at a quiet rate of flow, along the inner walls of the bottles, instead of dropping directly down into the bottles, thereby preventing foaming.

In flowing upwardly through the counter-pressure relief passages as described above, the beer will only rise in these passages to the level of the beer in the central reservoir. In the present machine, the length of these passages between the filling heads and the reservoir is of minimum extent and the passage itself is of a small diameter so that only a very small quantity of beer can move into the passage.

Another important object of the invention is to provide a filling machine wherein the trips for operating the filling valves to their various positions may be adjusted with respect to the path of movement of the filling table. This adjustment permits the filling cycle to be very accurately controlled by the bottling plant operator and, furthermore, permits the machine to be correctly adjusted for the filling of bottles of different sizes. For example, in the filling of bottles of larger sizes, it is desirable to slightly extend the period during which beer flows to the bottles by varying the distance between the filling trip and the neutral trip.

Another object of the invention is to provide a filling valve which is so constructed that wear of the packing between the filling valve body and the moving filling valve disc will be substantially eliminated.

The point at which wear is most apt to occur is at the portions of the packing opposite which the ports of the moving valve disc are positioned when the valve disc is at neutral position. This wear occurs because of the fact that when the valve disc is in neutral position, its ports are aligned with a blank area of packing. Since the valve ports contain some moisture, this moisture is very apt to result in a swelling of the packing opposite the ports. The face of the moving valve disc closely engages the packing and, as a result, the movement of the valve disc frequently causes the portion of the packing which is swollen and protrudes into the passages of the valve disc to be sheared by the edges of the valve disc ports upon movement of the disc. Fragments of the packing thereby become positioned in the valve passages and form an obstacle to flow through these passages.

In the filling heads of the present invention, the packing between the filling head valve body and the moving valve disc is cut out at the areas of the packing which will be in alignment with the ports of the valve disc when the valve disc is in neutral position and these cut-out portions of the packing are preferably filled with hard plugs having their outer surfaces substantially flush with the outer surface of the packing. By this arrangement, when the valve disc is in neutral or closed position, moisture in the valve disc passages cannot come in contact with the packing and the swelling of the packing referred to above cannot result.

Another object of the invention is to provide a crowning mechanism which is so designed that the crowning cylinders thereof will be properly guided in the supporting member in which they reciprocate, so that lateral sway and turning movement of the cylinders will be positively prevented. This object also comprehends a guiding means which may be readily adjusted to compensate for wear.

By the crowning structure of the present invention, readily adjustable and easily replaceable guide members are provided in the block of the crowning mechanism, so that when wear occurs, these guide members may be readily turned to expose a new guiding surface or, if necessary, the guides may be entirely replaced.

Another object of the invention is to provide an extremely simple mechanism to stop the operation of a filling machine when the bottles moving therethrough become jammed.

Heretofore, it has been customary to provide several mechanisms to stop the operation of a filling machine, one such mechanism being positioned at each joint in the path of travel of the bottles at which a jam might occur. By the present arrangement, only the trip device of such a mechanism is positioned at each of the points at which jamming might take place, the several trip mechanisms being operatively connected to a single stop control mechanism by an improved form of mechanical connection.

A still further object of the invention is to provide a stop control mechanism which includes brake means to bring the machine to a complete stop immediately upon the occurrence of a jam in the machine. In prior filling machines, devices to cause the machine to be stopped upon the occurrence of a jam have been provided, but these mechanisms have merely caused the controlling clutch of the machine to be disengaged. If only the clutch is disengaged, it is of course possible for the moving elements of the machine to continue their operation for a short period of time and, during this interval, bottles may be broken or parts of the machine may be damaged. In the machine of the present invention, the control mechanism causes the clutch to be disengaged and also actuates a brake which will immediately bring the machine to a complete stop so that the possibility of damage will be reduced to a minimum.

Another object is to provide an improved means to render the individual filling heads inoperative when no bottle is positioned beneath their filling nozzles.

Other objects and advantages of the invention will be apparent from the following drawings, wherein like numerals refer to similar parts throughout the views.

In the drawings:

Figure 1 is a view of the machine, partly in plan and partly in horizontal cross-section, a portion of the filling table and the cover of the filling reservoir being omitted.

Figure 2 is a vertical sectional view of the machine, a portion of the work table and also a number of the filling heads being omitted.

Figure 3 is a vertical sectional view on the line 3—3 of Figure 1, the filling table being omitted from this view.

Figure 4 is a detail central vertical sectional view showing an air pressure chamber within the filling table.

Figure 5 is a horizontal sectional view taken on the line 5—5 of Figure 4.

Figure 6 is a vertical sectional view through one of the bottle supporting platforms of the filling table.

Figure 7 is a horizontal sectional view, taken in different planes, of the bottle supporting platform lifting mechanism.

Figure 8 is a development showing the position of the bottle supporting platforms of the filling table when opposite the work table, the view of the platforms being in side elevation.

Figure 9 is a detail view, partly in vertical longitudinal section, of the structure for supporting the counter-pressure and filling trip.

Figure 10 is a detail view, partly in vertical longitudinal section, showing the structure for supporting the neutral or closing trip.

Figure 11 is a vertical sectional view, showing a bottle supporting platform and the mechanism for rendering the counter-pressure trip ineffective when no bottle is positioned upon a platform.

Figure 12 is a diagrammatic view showing the mechanism for rendering the counter-pressure trip ineffective when no bottle is positioned upon a bottle supporting platform.

Figure 13 is a front elevation of one of the filling heads.

Figure 14 is a view, partly in vertical section taken in a plane substantially radially of the filling mechanism, of one of the filling heads and diagrammatically showing the passages of the filling head as aligned for the counter-pressure stage of the filling cycle.

Figure 15 is a view similar to Figure 14 diagrammatically showing the passages of a filling head as aligned for the filling stage of the filling cycle.

Figure 16 is a vertical transverse sectional view through one of the filling valve discs, showing the valve disc in neutral or closed position.

Figure 17 is a front view of one of the filling head valve bodies with the valve disc removed.

Figure 18 is a sectional view taken on the line 18—18 of Figure 16.

Figure 19:
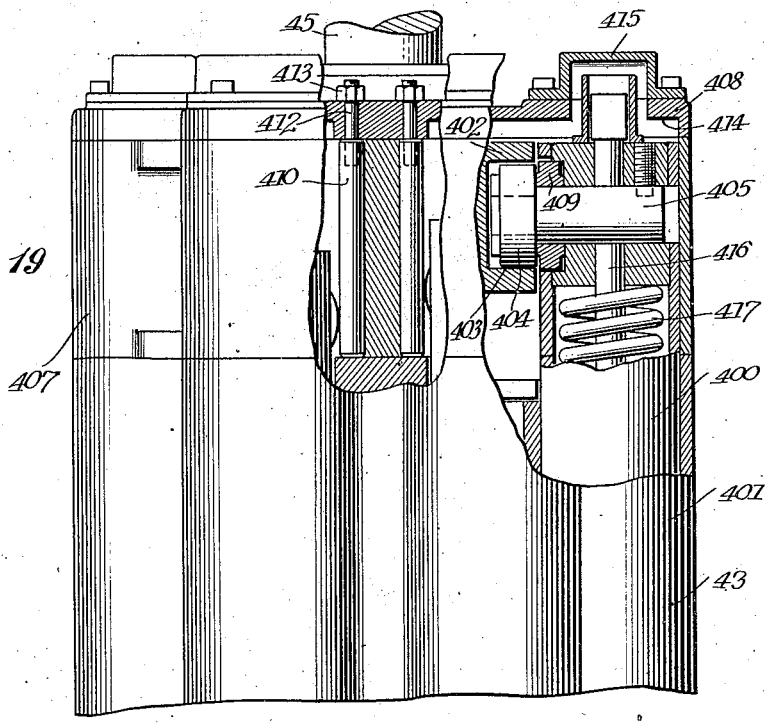
Figure 19 is a detail view of the crowning mechanism, the view being partly in vertical section, the two sections illustrated being taken in different planes.
Figure 20:
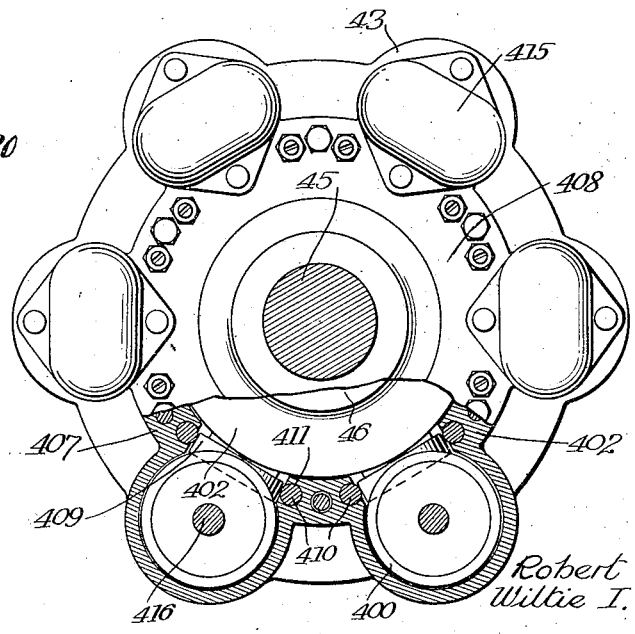
Figure 20 is a top view of the crowning mechanism, a portion being shown in horizontal section.

The filling machine of the present invention is illustrated in general assembly in Figures 1, 2 and 3 and comprises a fixed or work table 41, a filling mechanism 42 and a crowning mechanism 43, the filling mechanism being supported adjacent the fixed table 41 upon a standard 44 and hollow posts projecting upwardly from the latter. The crowning mechanism 43 is supported upon a non-rotatable post 45 (Figure 3) and the crowning heads are moved about post 45 by a hollow shaft 46 which rotates about this post.

As is best shown in Figure 1, a straight line endless conveyor 47 having its upper run flush with the level of the work table 41 moves bottles into the machine at 48, the bottles being removed from the conveyor 47 by an infeed dial 49. The bottles are moved about the dial 49 in a counterclockwise direction to the rotary filling table 42. During the movement about the filling mechanism 42, the bottles are filled with any desired liquid, in the present instance, beer. The filled bottles are removed from the filling mechanism by an outfeed dial 50 which moves them, in a counterclockwise direction, to a rotary table 51 fixed to the rotary shaft 46 of the crowning mechanism. From the crowning mechanism, the bottles move upon the outfeed end of the straight line conveyor 47 which carries them from the filling machine to a pasteurizer.

It will be understood that the endless conveyor 47 moving entirely through the machine may be replaced by a straight line endless conveyor, driven from the present filling machine, for feeding empty bottles to the machine, and an additional straight line conveyor, driven from a pasteurizer, to remove bottles from the filling machine and convey them to the pasteurizer.

The entire machine is supported upon a base 55 which has side walls 56 and 57 extending upwardly from the forward portion thereof to support the work table 41. These walls are joined by a front wall, not shown, and, with the latter wall, form a casing for the driving mechanism of the machine.

The driving mechanism and gearing

The machine is driven by means of an electric motor 60 shown in Figure 3, the shaft of which carries a speed changing mechanism 61, preferably of the Reeves type, and comprising two opposed disc-shaped drums, indicated in dotted lines, mounted upon the shaft and pressed toward each other by a spring, not shown. An endless belt 62 moves between the opposed drums and drives a pulley 63 included in a fluid pressure controlled clutch 64 carried by a worm shaft 65 which forms part of a gear reducing mechanism 66. A braking device 67 is provided on the opposite end of the worm shaft 65, which end projects from the casing of the gear changing mechanism 66.

The base of the motor 60 is slidably fitted in guideways 73, the motor being moved in the slideways by means of a threaded shaft 74 extending through the side wall 56 of the casing and provided at its outer end with an operating handle. By this arrangement, the position of the motor relative to the gear reducing mechanism 66 may be varied to change the point of engagement of the belt 62 upon the opposed drums 61 and with respect to the axis of the drums, thereby changing the speed at which the machine is operated.

The brake device 67 is disengaged from the worm shaft 65 when the fluid pressure clutch 64 is engaged. The operation of these devices will be subsequently described.

A vertical shaft having a pinion 75 fixed thereto is included in the gear reducing mechanism 66 and drives a pinion 76 fixed to a vertical shaft 77 which carries the outfeed dial 50. The shaft 77 is journalled in the work table 41 and also in webs 78 and 79 extending between the vertical supporting walls of the work table in planes parallel to the surface of the table. A pinion 80 fixed to the shaft 77 engages a large ring gear 81 fixed to the rotary table of the filling mechanism 42 to turn the table. A stub shaft 82 journalled in both the work table and the web 78 carries the infeed dial 49 and has a pinion 83 secured thereto meshing with the ring gear 81 to drive the infeed dial 49. The rotary tubular shaft 46 of the crowning mechanism is journalled in a sleeve 84 formed integral with the supporting walls of the work table and carries a pinion 85 adjacent its lower end which meshes with and is driven by the pinion 76.

A beveled gear 86 is fixed to the outfeed dial shaft 77 and drives the straight line conveyor 47 by means of driving connections arranged in any well known manner.

In order to insure that the bottles will be fed to the infeed dial 49 in properly spaced relation, a gate mechanism 87 is provided at the infeed end 48 of the endless conveyor 47. The mechanism 87 is identical with that disclosed in the application of Wiltie I. Gladfelter, Ser. No. 626,151, filed July 29, 1932, Bottle capping machine.

In order to prevent bottles from becoming jammed adjacent the infeed dial 49, a trip mechanism 88 is provided alongside the endless conveyor 47, preferably substantially opposite the gate mechanism 87. The mechanism 88 is also substantially identical with the corresponding structure disclosed in the above mentioned Gladfelter application and includes a guide plate 89 extending parallel with the course of the endless conveyor 47, the plate 89 being pivoted at a point 90 adjacent its outer end. In the event that bottles become jammed opposite the plate 89, the plate will swing outwardly and thereby actuate a control mechanism to stop the machine. A preferred form of connection which may be used to operate the control mechanism from the plate 89 will be hereinafter described.

As shown in Figure 1, a guide plate 91 is fixed upon the work table 41 to guide the movements of the bottles upon this table. The plate 91 has the inner portion of its perimeter shaped to define a path of movement for the bottles engaged by the infeed dial 49 so that the bottles moving about this dial will be properly guided to the bottle supporting platforms upon the filling table. The plate 91 likewise defines a course of travel for the bottles moving with the outfeed dial 50 and retains them in the bottle pockets of the dial during their movement to the dial 52 of the rotary table 51 beneath the crowning mechanism. As shown in Figure 1, the plate 91 includes an extension 91a projecting between the crowning mechanism dial 52 and the rotary crowning table 51 to insure that the bottles will be properly fed to the crowning mechanism. The guide plate 91 is so shaped at its right-hand edge that the bottles will move from the crowning mechanism at a tangent to the rotary table 51 and then upon the outfeed end of the endless conveyor 47.

Guide plates 93 and 94, respectively, are also positioned about the course of travel of the bottles through the crowning mechanism, both of these plates being adjustable with respect to the axis of the crowning mechanism to permit the width of the path of travel of the bottles to be varied so that bottles of various sizes may be moved through the machine.

A mechanism 95 to prevent jamming of bottles is provided at the outfeed end of the machine, this mechanism including a plate 96 pivoted at a point 97 adjacent its outer end. This mechanism operates in the same manner as does the mechanism 88 at the infeed end of the machine. In order to eliminate the necessity of a stop control mechanism at each of the trip mechanisms 88 and 95, rods 98 are operatively connected to the plates 89 and 96. As shown in Figure 1, the outer ends of the rods 98 are connected to the plates, the inner ends of the rods having clevis members including pins 100 threadedly connected thereto and suitably held in position by means of lock nuts. Each pin extends through a slot 99 in one of a pair of lugs 101 provided on diametrically opposite sides of a shaft 102. As shown in Figure 1, the lugs are slotted so that one rod 98 may exert a pulling action upon the shaft 102 without affecting the other rod, the pin connected to the latter rod then moving freely in the slot of its associated lug. The shaft 102 also includes an arm 103 which actuates an air control valve assembly 104 when the shaft is turned by the action of the rods 98. The air control valve assembly 104 is of the same construction as the corresponding valve assemblies shown in the above mentioned Gladfelter application. The mechanism or circuit through which actuation of the air control valve assembly will stop the machine will be hereinafter described.

The bottle spacing mechanism 87 and the jam preventing trip mechanisms 88 and 95 are so secured to the table 41 that their positions may be adjusted to permit the passage of runs of bottles of different sizes past the same. Also, the infeed dial 49, outfeed dial 50 and the crowning mechanism dial 52 are so secured upon their shafts that they may be readily removed and replaced by dials having pockets therein to fit runs of bottles of different sizes.

*The means for vertically adjusting the filling and crowning mechanisms*

The filling mechanism 42 and the crowning mechanism 43 are so designed that the operating heads of these structures may be vertically adjusted to enable the mechanisms to operate upon runs of bottles of different heights. Referring to Figure 3, the non-rotatable post 45 of the crowning mechanism 43 is threaded at its lower end, the threaded portion carrying a worm gear 110. The gear 110 is adapted to be rotated by a worm 111 fixed to a shaft 112 extending through the front wall of the machine. The post 45 is held against rotation by a key 113 which fits in a keyway or slot extending vertically of the post. By this arrangement, rotation of the shaft 112 will rotate the worm gear 110, resulting in vertical movement of the post 45 and the crowning mechanism 43.

The table 115 of the filling mechanism 42 rotates about a fixed tubular member 116 which extends upwardly from the standard 44, the table being supported upon bearings 117 provided at the upper end of the standard and surrounding the member 116 as shown in Figure 2.

The table-like casting 120 which, at its central portion, supports the filling reservoir 121 and has the filling heads secured to its periphery, is supported for vertical adjustment with respect to the table 115 of the filling mechanism by the structure now to be described. A tubular member 122 is fixed to the table 115, the member 122 being provided with external threads 123 at its upper end. A tubular member 124 fixed to and depending from the casting 120 is provided with internal threads engaging the threads 123. The lower tubular member 122 is provided with an external axially extending keyway 125 upon its outer surface which is adapted to be engaged by a key block 126 guided for radial movement in a recess 127 in the inner wall of the depending tubular member 124. The key block 126 has a threaded stud 128 projecting from its rear surface, the inner end of the stud being rotatably connected to the key block 126 and having its threaded portion engaging a threaded bore in the wall of the tubular member 124. The outer end of the stud 128 is headed so that it may be engaged by a wrench, and a lock nut may be provided upon the stud to hold it in proper position. When the key block 126 is withdrawn from the keyway 125, the casting 120 and the filling heads carried thereby may be turned upon the threaded sleeve 122 and with respect to the table 115 and the bottle supporting platforms carried by the latter to either raise or lower the filling heads. The provision of the key block and keyway will insure that the casting 120 may be repositioned in such a manner that the filling heads and bottle supporting platforms can be properly aligned after adjustment.

*The mechanism for lifting the bottle supporting platforms*

The machine illustrated in the present invention is provided with forty filling heads and a corresponding number of bottle supporting platforms. The infeed and outfeed dials 49 and 50, respectively, and the dial 52 of the crowning mechanism are each provided with six pockets, in order to keep pace with the filling mechanism.

Referring to Figure 6, the bottle supporting platforms are designated by the numeral 130. Each bottle supporting platform includes a bottle engaging member 131 which is secured to an upstanding shoulder 132 integral with the rear side of the platform by a releasable engaging means in order that the members 131 may be removed and replaced by corresponding members adapted to fit bottles of other sizes. An upwardly extending arcuate flange 133 is provided upon each bottle engaging member 131, this flange being spaced from the shoulder 132 in order that the extension 91a on the guide plate 91 fixed to the stationary table may pass beneath the flange 133. The extension 91a is provided for the purpose of guiding bottles to and from the bottle supporting platforms.

A piston 134 including a depending skirt 135 is fixed to each bottle supporting platform 130, the skirts 135 being reciprocable in collars 136 equidistantly spaced about the filling table 115 adjacent the periphery of the latter, the collars forming bearing apertures for the sleeves 135. As shown in Figure 7, angle members 137 extend downwardly from the filling table 115 between the depending sleeves 135, a ring 138 of substantially the same diameter as the filling table being secured to the lower ends of the angle members. A stationary tube 139 is positioned within each of the reciprocable sleeves 135, the lower end of each tube being secured in a fitting 140 bolted or otherwise suitably held upon the underside of the ring 138. The upper ends of the tubes are open, the tubes thus cooperating with the skirted pistons to form chambers.

Each fitting 140 is provided with an angled passage 140a which communicates with the interior of the tube 139 and also with a circular manifold pipe extending about the filling table beneath and within the ring 138, the manifold pipe 141 preferably being secured to each fitting 140 by blocks 142 through which the pipe 141 extends, the blocks being fixed to the fittings 140 by means of bolts or the like. A packing 143 contacting with the inner wall of the depending sleeve 135 is secured to the upper end of each tube 139 by means of a flanged collar 144, the packing serving to prevent the escape of any fluid from between the tube and the surrounding skirt and thereby sealing the chamber associated with each bottle supporting platform.

The manifold 141 is connected to a pressure reservoir 145 (Figure 2) within the stationary tubular member 116 about which the filling table 115 rotates, by means of a pipe 146 which extends upwardly from the manifold 141 between two of the depending sleeves 135 as shown in Figure 7. In the embodiment of the machine illustrated in Figure 2, a constant pressure of air is maintained in the pressure reservoir 145, pipe 146, manifold 141, and the chambers formed by the tubes 139 and the skirted pistons, this pressure preferably being maintained at approximately sixty pounds. Air is supplied to the reservoir 145 through a pipe 145a.

As shown in Figure 2, the tubular member 116 which defines the chamber 145 is closed at both ends and, substantially midway of its length, and within the portion which extends through the table 115, it is, as best shown in Figures 4 and 5, provided with a plurality of circumferentially spaced apertures 147. A collar 148 surrounds this portion of the tubular member 116, the collar being recessed to accommodate a ring 149 which is provided at its upper and lower ends with inwardly and outwardly extending flanges 150 as shown in Figure 4. The ring is also provided with circumferentially spaced apertures or ports 151. The inner end of the pipe 146 extends through the hub portion of the table 115 opposite the ring 149. The flanges 150 on the ring 149 will provide flow passages within and without the ring so that air from the chamber 145 may flow through the ports 147 in the tubular member 116 and thence through the ports 151 in the ring 149 to the pipe 146 when these ports are not in alignment. Packing rings 152 are positioned above and below the ring 149 within the recess of the collar 148 to effectively seal the pressure chamber and fluid circuit at this point. A drain 153 may be provided for the chamber 145 as shown in Figure 2.

The inner end of pipe 146 preferably extends into the collar 148 and a locking pin 148a may also extend through the hub of the table and into the collar 148 so that the latter will rotate with the table 115.

The depending sleeve 135 of each bottle supporting platform 130 is provided on the inner side of its lower end with a roller 155 which moves between and engages the sides of adjacent angled members 137 as shown in Figure 7, thereby insuring that the bottle supporting platforms will not turn during their reciprocation. The rollers 155 are journalled on studs 156 projecting from collars 157 threaded upon the lower ends of the sleeves 135 as shown in Figure 6. The studs 156 also have rollers 158 journalled thereon at their outer ends, the rollers 158 being held in position on the studs by means of headed machine screws 159. A cam track 160, which is arcuate in horizontal section, is fixed to the stationary portion of the machine on the inner side of the path of turning movement of the bottle supporting platforms 130 with the filling table. The cam track is so arranged that the rollers 158 of the bottle supporting platforms will contact with the undersurface thereof to draw the bottle supporting platforms downwardly to position their bottle supporting surfaces flush with the surface of the work table 41 when adjacent the latter.

As shown diagrammatically in Figure 8, the approach portion 161 of the cam track, that is, the portion with which the cam rollers first contact, is downwardly inclined while the opposite or exit end 162 of the track is upwardly inclined, the inclination of the portion 162 preferably being somewhat sharper than that of the portion 161.

The downward movement of the bottle supporting platforms is accomplished against the pressure in the fluid pressure circuit acting upon the piston 134 included on each bottle supporting platform. Because of the fact that at the moment that one bottle supporting platform moves opposite the cam 160 to be drawn downwardly, another bottle supporting platform will be moving out of engagement with the cam, the pressure in the fluid circuit will be maintained substantially constant. That is to say, the fluid which is driven from one bottle supporting platform will be distributed in the circuit to raise another platform.

It will be noted by the above arrangement, it is unnecessary to provide any valves in the pressure circuit and since the fluid is not exhausted from the circuit, it is unnecessary to have a constantly acting pump connected to the circuit. Furthermore, because of the fact that the depending sleeves 135 entirely surround and enclose the upwardly projecting tubes 139, beer which may overflow from bottles cannot come in contact with the outer walls of the tubes 139 and be deposited thereon. Beer deposited in this manner becomes gummy and retards the reciprocation of the platforms.

As shown in Figure 6, the collar members 136 through which the sleeves 135 move each has a boss 136a at its upper end, the upper surface of the boss being downwardly inclined to direct overflowing liquid from the bearing aperture of the collar member. Also, as shown in Figures 6 and 8 the bottle platforms 130 are of much greater area in a horizontal plane than the cylinders 135, with the result that any liquid overflowing from the platforms 130 will not drop or normally come adjacent the bearing apertures of the collar members.

Lubricant may be supplied to the platform lifting pressure circuit at any desired point to insure that the sleeve pistons and the tubes upon which the latter move will be properly lubricated.

The filling trips

In the normal operation of the machine, as a bottle supporting platform 130 carried by the rotating filling table 42 and moving in the direction of the arrow in Figure 8 approaches the work table 41 from the right (Figures 1 and 8), the roller 158 provided on that bottle supporting platform will contact with the fixed cam track 160 provided adjacent the inner side of the path of movement of the bottle supporting platforms.

Contact of a roller 158 with the cam causes the bottle supporting platform to which that roller is attached to be drawn downwardly from the position shown at A in Figure 8 to the position shown at B, wherein the upper surface of the bottle supporting platform is flush with the surface of the work table. The outfeed dial 50 will remove the filled bottle from the platform and direct it to the crowning mechanism. As the rotation of the filling table continues, the roller 158 will remain beneath the lowest portion of the cam track 160 while the platform moves to the position indicated at C, at which time the infeed dial 49 will place an empty bottle upon the platform.

The filling mechanism 42 is provided with forty filling heads 180, one positioned above each of the bottle platforms 130 and supported upon the periphery of the casting 120 upon which the filling reservoir 121 is supported. Each filling head comprises a body portion 181 provided with a rotatable filling valve disc 182 to control the flow of liquid and air therethrough in a manner hereinafter described. Each filling head is also provided with a filling nozzle 183 having a centering bell 184 slidably mounted thereon. Integral with each filling valve disc 182 is a downwardly extending valve lever or arm 185 and an upwardly extending valve lever or arm 186, the two arms' being formed integrally and arranged at an angle with respect to each other as shown in Figures 8 and 13. The downwardly extending arm 185 is provided with an outwardly projecting or offset portion 187.

After a bottle is received upon a platform 130 from the infeed dial 49, the continued rotation of the filling table 115 will cause the roller 158 of the platform to move upwardly, this movement occurring almost immediately the platform has moved past the position at which the bottle is placed thereon. As has been heretofore explained, fluid under pressure will immediately act through the manifold 141 and tube 139 associated with that platform to raise the latter so that the bottle positioned upon the platform will be moved upwardly against the interior of the centering bell 184 positioned above the platform. The centering bell is provided with an inwardly inclined inner wall to insure that the bottle is centered on the platform so that its mouth will move up about the filling nozzle 183. The fluid which raises the bottle platform is under sufficient pressure to hold the bottle pressed against the interior of the centering bell and thus provide a tight seal between the mouth of the bottle and the bell.

The integral valve arms 185 and 186 of each filling head are adapted to be moved to various positions during the rotation of the filling mechanism to successively move the filling valve disc 182 of a head to counter-pressure position, filling position, and neutral or closed position, as shown in Figure 13. The movement of each valve to these positions is accomplished by means of trips spaced about the path of turning movement of the filling mechanism. As is shown in plan in Figure 1 and in vertical section in Figure 8, these trips comprise a counter-pressure trip 190, a filling trip 191 and a neutral or closed trip 192.

The mounting of the trips 190, 191, and 192 is best shown in Figures 9 and 10, and the detail construction of the counter-pressure trip is shown in Figure 12. Referring to Figure 12, it will be noted that the counter-pressure trip 190 is in the form of a pin having a piston 195 secured thereto, which piston is mounted in a horizontal cylinder 196. The cylinder 196 is fixed to a stud 197 which projects through a bore 198 of a boss 199 provided upon a bracket 200 mounted upon a post 201 which, as shown in Figure 1, extends upwardly from the left-hand edge of the filling table 115. As shown in Figure 12, the stud 197 is provided at its lower end with a collar 202 carrying a spring-pressed pin 203 in its upper face. The head of the pin 203 normally fits in a socket 204 in the lower surface of a plate fixed to the boss 199. By this arrangement, the cylinder 196 and stud 197 may turn relatively to the boss 199 and bracket 200 in the event that a jammed filling valve arm should come in contact with the counter-pressure pin 190 and breakage of either the valve arm or the pin will thereby be avoided.

As shown in Figures 1, 8 and 9, the filling trip 191 is in the form of an arm which normally projects into the path of movement of the lower arms 185. However, trip 191 is mounted in one part of a two-part fitting 205, the two parts of which are relatively movable with respect to each other in substantially the same manner as the stud 197 and boss 199 associated with the counter-pressure trip 190. The trip arm 191 may thereby swing in the event that a jammed filling valve arm should come in contact therewith. In order to permit of adjustment of the filling trip 191 with respect to the counter-pressure trip to enable the length of the counter-pressure stage and the filling stage to be varied, the bracket 200 which carries these two trips includes a horizontal flange 206 provided with a plurality of longitudinally spaced apertures 207. The fitting 205 includes pins 208 on its lower surface which may be positioned in apertures 207 to hold the fitting and the filling trip in the desired position with respect to the counter-pressure trip 190, the pins 208 being threaded to receive binding nuts as shown in Figure 9.

As shown in Figures 1 and 10, the neutral or closing trip 192 is in the form of a pin projecting from a fitting 210. The fitting 210, like the fitting 205 just described, is formed of two relatively movable parts which normally remain in such position that the trip 192 will project into the path of movement of the filling valve upper arms 186, but may turn upon contact with a jammed valve arm. An extension 211 is provided on the upper portion of the fitting 210 to permit that portion of the fitting to be turned back to proper position after it has been swung out of the path of the valve arms by a jammed valve arm. As shown in Figure 1, the fitting 210 is mounted upon the horizontal flange 212 of a bracket 213 extending from a post 214 provided at the right-hand end of the work table 41. The flange 212 of bracket 213 is provided with longitudinally spaced apertures 215, permitting the fitting 210 carrying the trip to be moved with respect to the path of the filling heads and with respect to the filling trip 191 to vary the point at which the filling head valve arms will be operated to neutral or closed position.

The brackets 200 and 213 which carry the respective trips are vertically movable with respect to the respective posts 201 and 214. The structure provided for accomplishing this vertical adjustment comprises a hand wheel 216 fixed at the upper end of a screw shaft, not shown, extending within each of the posts 201 and 214. The brackets 200 and 213 include portions extending into the posts to engage the screw shaft so that rotation of the hand wheels 216 will cause the brackets 200 and 213 to be moved vertically of the posts. This construction is identical with that disclosed in the application of George J. Huntley and Robert J. Stewart, Serial No. 671,266, filed May 15, 1933, Filling machine.

As has been stated above, during rotation of the filling mechanism, the filling valve arms 185 and 186 and the filling valve disc 182 of each filling head will be successively moved to different positions by the filling trips 190, 191, and 192, thereby filling the bottles carried on the bottle platforms. The detailed structure and the operation of the filling heads will be subsequently described.

*The means to render a filling head inoperative when no bottle is positioned beneath the filling nozzle thereof*

In order to prevent waste of beer, it is desirable to prevent the operation of a filling head when for any reason, no bottle is positioned beneath that head. Referring to Figure 8, the means to accomplish this purpose comprises a release control lever 230 pivoted on a stud 231 projecting from the inner side of the cam track 160 at the exit end of the cam track 160. Immediately the roller 158 of a bottle supporting platform moves out of engagement with the inclined surface 162 at the exit end of the cam track 160, it will contact with the lower face 232 on the outer end of lever 231. The opposite end of the lever 230 is operatively connected to a control valve generally indicated by the numeral 233, which valve is secured to the rear side of the cam track 160 and controls the position of the counter-pressure trip 190.

As shown in Figure 12, the release control lever 230 is operatively connected to the valve 233 by the engagement of the inner end 234 of the lever with a stud 235, which stud is carried by the valve stem 236 of the valve. The upper end of the valve stem 236 is counter-bored to receive a spring 237 which engages the lower and flanged end 238 of the stud 235 to normally hold the latter upwardly. The flange 238 of the stud is threaded to a collar 239 slidable on the valve stem 236, the upward movement of the collar and the stud being limited by a flange projecting inwardly from the lower end of the collar and arranged opposite an outwardly disposed shoulder on the valve stem. By the above arrangement, the release control lever 230 may move the stud 235 downwardly to a predetermined extent with respect to the valve stem 236 and without moving the valve stem, such movement being absorbed by the spring 237.

The valve stem 236 is reciprocable in a casing 240, the valve stem extending into the valve casing through a packed nut 241. Within the casing 240, the valve stem extends through an aperture 242 in a web 243 which extends transversely of the valve casing, substantially midway of the length of the latter. Valve seats are provided on the opposite faces of the web 243 and a downwardly facing valve 244 on the valve stem is adapted to cooperate with the upper seat while an upwardly facing valve 245, also on the valve stem, cooperates with the lower seat. Valve stem 236 is normally held in the position shown in Figure 12, i. e., with lower valve 245 seated, by means of a spring 236a. Air or other fluid under pressure is supplied to the valve from a source of pressure through a line 246 which opens to the valve casing at a point above the web 243.

A tubing 247 connects the control valve 233 with the counter-pressure trip cylinder 196, the tubing 247 opening to the valve casing within the bore 242 of the web 243, that is, between the two valve seats. The valve casing is provided with a vent 248 to atmosphere at the end beneath the lower valve 245.

When the valve stem 236 of control valve 233 is in the position shown in Figure 12, air under pressure may flow through the line 246, beneath the then open upper valve 244 and through the tubing 247 to the rear end of the cylinder 196, acting upon the piston 195 to hold the trip 190 in outward or tripping position, as shown in Figures 11 and 12, against the action of the spring 249 provided in the cylinder. The mechanism shown in Figure 12 will remain in this position so long as bottles are positioned upon each bottle supporting platform by the infeed dial 49 because, when a bottle is positioned upon a platform the upward movement of the latter will be limited by reason of the contact of the mouth of the bottle with the inner surface of the centering bell 184 provided on each filling head and the bottle platform will therefore only rise to a position approximating that indicated in D in Figure 8. When a bottle is in this position, its roller 158 will be at the position indicated in dotted lines at 158 in Figure 12, that is, the lower position shown in the latter figure. A roller 158 passing beneath the release control lever 230 in this position will not raise the outer end of the lever sufficiently to depress its opposite end 234 to such an extent as to vary the position of the valve stem 236 and air pressure will be maintained behind the piston 195 in cylinder 196 to hold the counter-pressure trip 190 outwardly. The offset portion 187 of the lower valve arm 185 of the filling head corresponding to that bottle supporting platform will therefore contact with the counter-pressure trip 190 and the valve disc 182 will be turned in a counter-clockwise direction as shown at position E in Figure 8.

However, in the event that no bottle is positioned upon a bottle supporting platform, the platform may rise to a greater extent than is the case when it carries a bottle to limit its upward movement. Because of this, the roller 158 of such a platform will be positioned somewhat higher when it leaves the cam track 160 and will rise to a position approximating that shown in dot and dash lines at 158a in Figure 12. The contact of a raised roller as at 158a with the lower surface 232 of the release control lever 230 will cause the opposite end 234 of the lever to be depressed, moving the valve stem 236 downwardly to seat the upper valve 244 and move the valve 245 away from its seat. With the valves in this position, the line 246 leading from the source of pressure will be cut off and the pressure in counter-pressure trip cylinder 196 will be released, the air in the cylinder flowing through tube 247 and past valve 245 to atmosphere through the vent 248.

With the pressure released from the cylinder 196, the piston 195 and counter-pressure trip 190 will be moved inwardly by the action of the spring 249 so that the offset portion 187 of the lower valve arm 185 corresponding to that bottle supporting platform will not contact with the counter-pressure trip and the valve will therefore remain in neutral or closed position, as indicated at F in Figure 8. It will be noted from Figure 8 that the filling trip 191 is arranged in such a plane that the offset portion 187 of a valve arm left at neutral or closed position (as shown at F in Figure 8) by failure of the counter-pressure trip 190 to engage therewith will not contact with the filling trip 191 but will pass beneath the latter. It results from the above that when a bottle supporting platform receives no bottle, its filling valve will not be actuated to either counter-pressure position or filling position and neither counter-pressure air nor beer will be wasted.

The surface 232 of the release control lever 230 with which rollers 158 contact is of sufficient length that a roller 158 will always be in contact therewith, for example, as one roller is moving from beneath the lower surface of the lever, another roller will be moving inwardly at the other end of the surface. By this arrangement, the lever will be supported in proper position by the rollers.

As has been stated above, the spring 237 within the control valve 233 will permit the lever 234 to the moved to some extent without changing the position of the valve stem 236. Because of this, the mechanism will not be affected by reason of the passage through the machine of bottles of slightly different heights but will only be actuated by the absence of a bottle from a bottle supporting platform. Bottles of predetermined capacities frequently vary to some extent in height and the arrangement of the mechanism to accommodate differences in height is therefore of considerable importance.

The filling head construction

Figures 13 to 18 illustrate the filling head included in the present machine, Figure 14 diagrammatically illustrating the alignment of the passages or ports of the filling head when the filling valve is in counter-pressure position; Figure 15 diagrammatically illustrating the alignment of the passages when in filling position and Figure 16 showing the positioning of the valve disc 182 with respect to the valve body 181 when the valve disc is in neutral or closed position.

As has been heretofore stated, each filling head 180 includes a valve body 181 having a filling valve 182 rotatably positioned on the outer face 250 thereof, the valve disc 182 being rotatably mounted upon a stud 251 which projects from the center of the outer face of the valve body. As best shown in Figure 14, the valve disc is held in position against the valve body by means of a nut 252 threaded on the outer end of the stud 251, and anti-friction member 253 being interposed between the nut and the outer side of the valve disc. The anti-friction member is provided, on its inner face, with a ring 254 which moves upon roller bearings 255 within the member. The opposite face of the anti-friction member 253 is provided with a washer 256 which bears against a resilient packing ring 257, and the nut 252 bears upon the ring 256. By this arrangement, the nut 252 may be tightened to the extent necessary to maintain a tight seal between the valve disc 182 and the valve body 181, without exerting any appreciable retarding effect upon the rotation of the valve disc.

A disc 260 of rubber or other material having a corresponding degree of resiliency is provided on the seat face 250 of the valve body 181 and a leather washer 261 is positioned on the rubber washer. The smooth dressed face of the leather washer contacts with the inner face of the valve disc, thereby insuring a minimum degree of friction between the valve disc and the washer. The presence of the rubber washer behind the leather washer will prevent the escape or flow of gas or liquid behind and between the washers and faces of the valve body and valve disc. The washers are provided with ports aligned with the mouths of the passages in the valve body 181 and small collars 262 seated in the valve body passage mouths extend into the ports of the washers, thereby preventing rotation of the washers with respect to the valve body and also eliminating the possibility of the leather washer being saturated with liquid.

Figure 17 shows the seat face of the valve body with the valve disc removed and, as is illustrated in this figure and also in cross-section in Figures 14, 15 and 18, a plurality of metal inserts or plugs 263 are fitted in the face of the valve body, the inserts extending through aligned apertures provided in the washers 260 and 261, the outer faces of the plugs or inserts being slightly depressed beneath the level of the leather washer 261, or at least not extending beyond the face of the leather washer. The plugs 263 are so spaced about the seat face of each valve body 181 that they will be aligned with the ports or passages in the valve disc when the latter is in neutral or closed position, the plugs preferably being of slightly greater diameter than the passages with which they are intended to be aligned.

In previous types of filling heads, the areas of the filling head washer which have been aligned with the mouths of the passages of the valve discs while the valve disc is in neutral or closed position have been moistened by liquid remaining in the valve disc passages. Such moistening causes these areas to swell and project into the valve disc passages and movement of the valve disc results in shearing of the projecting portions of the washer by the edges of the mouths of the valve disc passages. Small particles of the washers are thereby cut loose and may move into the passages of the filling head, resulting in slackening or perhaps stoppage of the flow through these passages. By the present arrangement, the metal plugs 263 and not the leather washer are exposed to the ports or passages in the filling head in the valve disc when the latter are not aligned with passages in the valve body, as when the valve disc is in closed or neutral position. The difficulty mentioned above is therefore entirely eliminated. The plugs 263 may of course be of any hard material.

The lower surface of the valve body 181 is provided with a downwardly projecting portion 265 upon which a collar 266 is secured by a flanged ring nut 267. A filling passage 268 extends centrally through the collar 266, this passage being aligned with a filling passage 269 which extends upwardly into the valve body and includes an angled portion 270 which opens to the seat face of the valve body. The filling nozzle or tube 183 is threaded in the passage 268 of the collar 266. A sealing ring 275 is provided on the lower face of the collar 266 and the lower face of the collar is recessed, as indicated at 276, within the sealing ring. A passage 277 communicating with the recess 276 extends upwardly through the collar, the upper end of this passage being aligned with an angled passage 268a in the valve body, the opposite end of the latter passage opening to the seat face of the body. In order to hold the collar 266 properly aligned with the valve body, a small collar may be provided in the passage 268a to extend into the passage 277 and aligning plugs may also be used. Sealing washers of suitable formation are also provided between the two members.

The centering bell 184 is slidable on the filling tube 183 and is provided with a bore 280 through which the filling tube 183 extends. A spiral passage 281 is provided in the wall of the bore 280, the upper end of this spiralled passage opening to the chamber 276 in the collar 266 when the centering bell 184 is in raised position as shown in Figure 14. The lower end of the spiralled passage terminates within a sealing ring 283 provided in the mouth of the bell. The sealing ring 283 is arranged to contact with the mouth of a bottle and it therefore follows that fluid flowing from the spiralled passage 281 will flow into the mouth of the bottle and move downwardly upon the inner wall of the bottle mouth.

The filling heads 180 are secured to an upturned flange 290 extending about the periphery of the casting 120, notches 290a being spaced about the flange and a filling head being positioned opposite each notch, as shown in Figure 16. Each filling head is provided with ears extending past the side walls of the notches 290a and through which bolts extend into the flange 290 to secure the filling head to the latter. A plate 181a is interposed between each filling valve body 181 and the flange 290, this plate being of the same shape as the rear face of the body 181.

Referring to Figure 14, beer is delivered to the filling heads 180 through a pipe 291 extending from a port in each plate 181a and through the corresponding notch 290a in flange 290 to the lower part of the reservoir 121, the port in the plate opening to a chamber 292 in the valve body 181. From the chamber 292, a passage 293 extends to the seat face of the valve body. A ball valve 294 is positioned in the chamber 292, which valve is adapted to be seated upon the mouth of the passage 293 in a manner hereinafter described.

Counter-pressure air is supplied to each filling head through a pipe 296 extending from a vertical passage 297 in the plate 181a behind that head and to the upper part of the reservoir 121. The pipe 296 is of relatively small diameter and fits into the upper end of the passage 297. A passage 297a extends at an angle from the upper portion of the passage 297 and opens to a passage 298 extending through the valve body 181 to the seat face of the latter. As best shown in Figure 14, the portion of the passage 297 below its point of communication with the passage 297a is filled by a closure or snifting screw 299, the outer end of this screw being threaded and headed to permit it to be readily removed from the passage. The provision of the screw 299 enables the counter-pressure passage 296 to be drained of any beer which may be present in the passage and also permits of the insertion in the pipe 296 of a cleaning wire or brush.

The arrangement of the passages in the filling valve disc 182 and the cooperation of these passages with the passages in the valve body 181 will be apparent from the following description of the operation of the filling head.

At the time that an empty bottle is positioned upon a bottle supporting platform 130, the filling valve disc 182 will be in neutral or closed position as shown in solid lines in Figure 13 and flow through the filling head will be entirely cut off as hereinafter explained.

When the lower valve arm 185 contracts with the counter-pressure trip 190, the valve disc 182 will be turned to the position indicated by the notation "counter-pressure" in Figure 13, the passages in the valve body and valve disc then being aligned as diagrammatically illustrated in Figure 14. With the elements in this position, only the passages through which counter-pressure air may flow to the body will be in alignment and air will flow through the tube 296 from reservoir 121 and thence through the passage 298 to the seat face of the valve body. The valve disc is provided with horizontal and parallel passages 301, 302 and 303, all of which passages are connected by an angled vertical passage 304 as shown in Figures 14 and 16. When the valve disc is in counter-pressure position, the horizontal passage 298 in the valve body is aligned with horizontal valve passage 301 so that air may flow through pipe 296, through these passages and then downwardly in valve passage 304 to passage 302, which will be aligned with valve body passage 268a. From passage 268a the air will move downwardly to the passage 277 and through the collar 266 into chamber 276. The air thus entering chamber 276 will move through the spiral passage 281 to the bottle, establishing the same pressure in the bottle as exists above the float and beer in the reservoir 121.

In the above position of the valve disc, horizontal passage 303 will be aligned with a plug 263, as shown in Figure 14.

Continued movement of the filling table will cause the filling trip 191 to move the valve arm and valve disc to the position indicated by the notation "filling" in Figure 13. The valve disc 182 will then be in the position diagrammatically illustrated in Figure 15.

As shown in Figure 15, the turning of the valve disc to filling position will cause the horizontal passages 302 and 303 in the valve disc to be respectively aligned with the air passages 298 and 268a in the valve body. The valve disc is also provided with horizontal passages 310 and 311 connected at their inner ends by a passage 312 and passages 310 and 311 will now be aligned, respectively, with the beer passage 293 and the passage 269, which latter passage communicates with the filling nozzle 183. Beer may therefore flow from the pipe 291 and past the ball check valve 294 through the passages 293, 310, 312 and 311 in the valve disc and thence through the passage 269 to the filling nozzle 183. The air in the bottle will be forced upwardly in the spiral passage 281 and through passages 277 and 268a to the filling valve, through which it will pass in the passages 303, 304 and 302, returning to the upper portion of the reservoir through the pipe 296. Beer will continue to flow into the bottle with the air exhausting in the manner described above until the bottle is filled with beer. At about this moment, or immediately thereafter, the upper arm 186 of the valve disc will contact with neutral or closing trip 192.

In the event that the bottle being filled is of smaller than rated capacity, or if for any reason a quantity of beer greater than the capacity of the bottle should flow into the latter before the valve disc is moved to neutral or closed position by the trip 192, the surplus beer will flow upwardly through the passages through which air has been flowing from the bottle. However, because these passages are of relatively small diameter and since beer will only flow through the air pipe 296 to a point on a level with the surface of the beer in reservoir 121, it will not be possible for a great quantity of beer to flow upwardly in the air passage. In any event, this beer will be retained in the passages when the valve disc is moved to neutral or closed position and will be disposed of on the subsequent movement of the valve disc to counter-pressure position and in a manner to be subsequently described.

The filling head of the present invention is provided with means to permit the escape of foam from the bottles. When a beer filling machine is first placed in operation for a run, for example, when the machine is set in operation in the morning, the first flow of beer through the tubes 291 to the bottles foams to a considerable extent because of the fact that the beer is warm. Usually the bottle will fill to but one-half of its capacity with beer, the remaining capacity of the bottle being occupied by foam. Regardless of the number of times which a bottle may be moved through the filling stage, the foam will not be replaced by beer and in order to enable the foam to escape, it is customary to have an operator "crack" the joint between the centering bell and the mouth of the bottle to open the bottle to atmosphere. This method of eliminating the foam is not at all satisfactory, particularly since some force must be applied to tilt the centering bell with respect to the mouth of the bottle to break the seal, because of the pressure with which the bottle supporting platform is holding the bottle against the interior of the centering bell.

In the present filling head a port 313 extends from the passage 304 to a circular chamber 314 having a casing member 315 threaded in its outer end. A valve member 316 including a stem 317 extending through an aperture 318 in the outer end of the casing is positioned in the chamber. The valve member 316 is provided with a socket at its inner end and a coil spring 319 positioned in this socket has the outer end thereof bearing against the inner wall of the chamber 314. A sealing or packing ring 320 is suitably held in a recess provided about the inner end of the valve stem 317.

The walls and the stem 317 of the valve member 316 have a loose fit with the inner walls and the aperture 318 of the casing member 315 and therefore, when the valve member 316 is pressed inwardly by pressure exerted upon the thumbpiece on the outer end of the stem 317 and against the action of the spring 319, fluid may flow from the chamber 314 through the aperture 318.

By the above construction, foam may be forced from a bottle being filled, by inward movement of the valve member 316, the beer from the bottle passing up from the counter-pressure passages and through the passages 313 past the valve 316 to atmosphere. Since the pressure in the bottles is slightly higher than that of atmosphere, the foam will be quickly eliminated.

In the event that a bottle is broken during the filling stage, opening the filling nozzle 183 to atmosphere, the beer in the tank will surge through the beer pipe 291. This sudden rush of beer will move the ball check valve 294 (Figure 18) against the seat provided at the inner end of the passage 293 so that waste of beer will be prevented. At other times, the ball check valve 294 will remain in the position indicated in Figure 18.

Contact of the upper arm 186 of the valve disc with the neutral or closing trip 192 as shown at G in Figure 8 will turn the valve disc and valve arms to the position shown in full lines in Figure 13 and marked "Closed." At this time, the passages in the valve disc 182 will be in the position relative to the passages in the valve body 181 indicated in Figure 16. That is to say, the mouths of the air flow passages 302 and 303 of the valve disc will be aligned with the small plugs or inserts 263, the mouth of the air flow passage 301 will be aligned with the valve body passage 268a which is in communication with the bottle, and the valve body passage 298 through which counter-pressure air is supplied and exhausted will be closed by the blank face of the valve disc. As is also shown in Figure 18, the valve disc horizontal beer passage 311 will be opposite the beer supply passage 293 in the valve body but the beer passage 310 will be opposite the large plug or insert 263 so that the flow of beer through the filling head will be prevented.

Immediately after the valve disc has been moved to neutral or closed position, the roller 158 will contact with the approach end 161 of the cam track 160 as shown in Figure 8 and the bottle supporting platform will be moved downwardly, breaking the seal between the bottle and the filling head.

The filled bottle will then be removed by the outfeed dial 50 and an empty bottle placed upon the platform by the infeed dial 49.

Upon the subsequent movement of the bottle platform past the counter-pressure trip 190 and the movement of the valve disc to counter-pressure position, any beer which might have moved upwardly in the counter-pressure air passages of the filling head during the filling of the bottle previously on the platform will move downwardly into the bottle. However, the provision of the spiral passage 281 in the centering bell 184, which spiral passage forms part of the counter-pressure air flow passage, will cause this beer to be directed against the inside wall of the mouth of the bottle instead of dropping straight down to the bottom of the bottle. The flow of the beer along the wall of the bottle will be comparatively quiet so that there will be no foaming of the beer. Because of the fact that the counter-pressure air pipe and the remaining counter-pressure air passages are of relatively small diameter, the quantity of beer which may be present in these passages will be comparatively small and this is an advantage because of the amount of beer which moves into the bottle in this manner is small, the possibility of foaming is correspondingly reduced.

The filling tank or reservoir 121 is supplied with beer through a pipe 340 connected to the Government vat, not shown, and to a beer pipe 342 within the fixed tubular member 116, as shown in Figure 2. Counter-pressure air is supplied to the machine from any suitable source of pressure through lines 344 and 346, all as shown in Figure 2.

The float control of the beer supply and counter-pressure air supply to the reservoir 121 is fully described in our above mentioned application for Filling machine, Serial No. 739,818, filed August 14, 1934, this construction being such that the flow of beer to the reservoir 121 is entirely controlled by the air pressure maintained in the reservoir, the air pressure and the beer level acting to control each other.

The reservoir 121 is also provided with a baffling means in the form of a flange 393 to prevent foam from reaching the counter-pressure tubes 296, as described in our above mentioned application.

The crowning mechanism

The crowning mechanism 43 comprises six crowning heads carried by crowning cylinders 400 equi-distantly spaced about a supporting structure 401 which is keyed to the rotating hollow shaft 46, the cylinders being vertically slidable in the supporting structure. The non-rotating post 45 within the hollow rotatable shaft 46 has a casting 402 fixed to the upper end thereof, which casting is provided with a cam track 403 in which rollers 404 journalled upon stub shafts 405 in the upper ends of the crowning head cylinder move. The cam track 403 extends about the periphery of the casting 402 and is of such configuration that each crowning head will be raised during the portion of its circular path of travel at which a bottle is positioned beneath it by the dial 50, then descend to crown the bottle and later rise again to permit the bottle to be moved from the crowning mechanism.

The crowning cylinders and heads provided in the present machine are identical with those disclosed in the application of George J. Huntley and Robert J. Stewart, Serial No. 671,266, filed May 15, 1933, Filling machine, except for the features discussed below.

The supporting structure 401 of the present machine entirely encloses the crowning cylinders 400, an upper section 407 being positioned upon the usual casting, this upper section extending up about the extreme upper portions of the cylinders. The upper section 407 is surmounted by a cover plate 408 extending over the tops of the crowning cylinders as shown in Figure 19.

The stub shafts 405 upon which the usual cam rollers 404 are journalled, loosely carry guide rollers 409 positioned behind the cam rollers 404, these guide rollers being of sufficient diameter to extend past the periphery of the crowning cylinders and contact with and move between spaced vertical guide rods 410 fitted in slots 411, arcuate in cross-section, in the upper section 407 of the supporting structure. The guide rods 410 have pins 412 fixed in their upper ends and the upper extremities of the pins are slotted so that the pins may be turned by a screw driver or the like. Lock nuts 413 are threaded upon the upper ends of the pins 412 so that the rods may be held in adjusted position.

By the above arrangement, the crowning cylinders 400 will be properly guided for vertical movement because the guide rollers 409 will prevent any lateral or turning movement of the cylinders with respect to the supporting structure. Since the rollers 409 are free to turn upon the stub shafts 405, they will continuously expose new wearing surfaces to the rods 410 between which they move. Also, because the guide rods 410 may be turned in their grooves 411, it will be a comparatively simple matter to expose new wearing surfaces thereof to the guide rollers. This arrangement eliminates the necessity of replacing the guide rollers 409, which operation would require the partial dismantling of the crowning mechanism. It will be obvious that if the guide rollers moved between the guiding surfaces formed integral with the upper section 407 of the supporting structure, they would have to be re-machined when worn, and larger-sized guiding rollers would have to be fitted upon the stub shafts 405.

The provision of the upper section 407 and cover plate 408 on the supporting structure 401 to entirely enclose the crowning cylinders enables lubricant to be introduced into the supporting structure to thoroughly lubricate the cylinders 400 and the cam track 403. As is shown in Figure 19, the cover plate 408 is grooved as shown at 414 to permit the free flow of lubricant about the upper portions of the cylinders. The plate 408 is also provided with a cap 415 positioned thereon above the central portion of each crowning cylinder, which cap may be removed to adjust the position of the usual crowning cylinder stem 416 to adjust the tension of the crowning cylinder spring 417.

Figure 21:
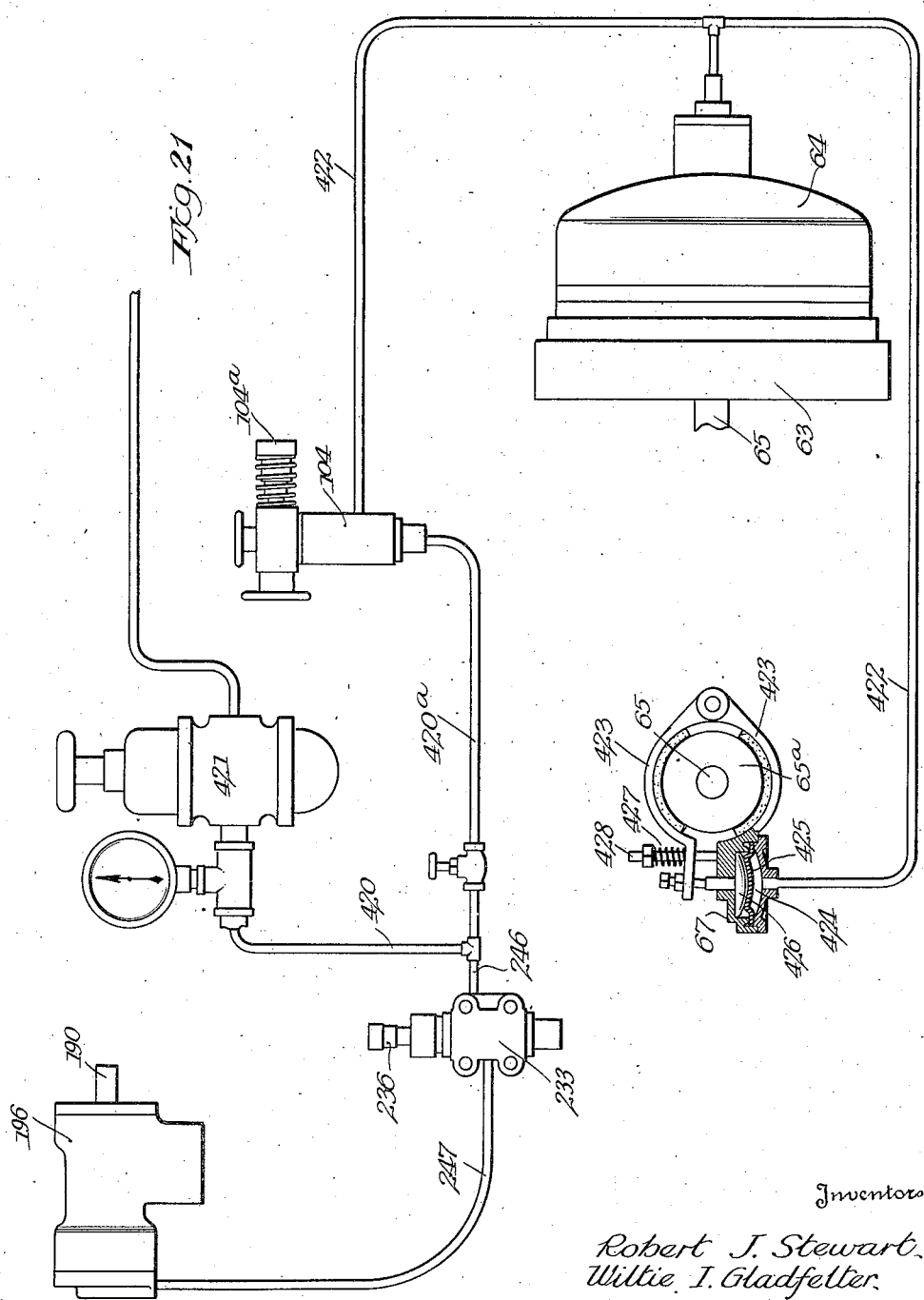
Figure 21 is a diagrammatic view showing the devices included in the fluid pressure circuit which controls the operation of the machine, the figure including a vertical sectional view through a brake device for preventing overrunning of the machine.

Figure 21 diagrammatically shows the devices included in the fluid pressure circuit which controls the operation of the machine. Air is supplied to the pressure circuit through a line 420 in which a pressure regulator and gauge 421 may be included. Air flows from line 420 through a branch 246 which supplies air under pressure to the control valve 233. Control valve 233 is illustrated in detail in Figure 12 and, as has been stated above, normally causes pressure to be supplied through a line 247 to the counter-pressure trip cylinder 196 to control the position of counter-pressure trip 190. When a bottle supporting platform 130 fails to receive a bottle from the infeed dial, valve 233 will be actuated to relieve the pressure in the cylinder 196 through the vent provided in the latter valve. A branch pipe 420a, which may be provided with a needle valve, extends from line 420 to the air control valve assembly 104 illustrated in Figure 1. This valve includes a slide 104a which, when pressed inwardly by the cam 103, which as shown in Figure 1, is operatively connected to the plates 89 and 96 positioned adjacent the straight line conveyor 48, will cause valve 104 to be actuated to exhaust pressure from a line 422 which communicates with the pressure controlled clutch 64 of the machine.

The detailed construction of the air control valve assembly 104 and the clutch 64 are identical with the corresponding structures disclosed in the application of Wiltie I. Gladfelter, Ser. No. 626,151, filed July 29, 1932, Bottle capping machines.

In order to insure that the machine will be promptly stopped when air pressure is released from the clutch 64 and air lines 422 by the air control valve assembly 104, an air controlled brake device 67 is provided on the worm shaft 65 of the gear reducing mechanism 66, this being the shaft which carries the air clutch 64. As shown in detail in Figure 21, the brake device 67 includes pivotally connected brake arms 423 and brake bands carried by these arms to engage a brake drum 65a carried by the worm shaft 65. The air line 422 opens to a chamber 424 in the device 67 and a diaphragm 425 is provided in this chamber against which the air pressure acts to hold the diaphragm and a plunger 426, mounted in the brake device behind the diaphragm, in the position shown in Figure 22. A spring 427 mounted upon a stud 428 exerts pressure upon the brake arms 423 so that when air pressure is released from the line 422 by the control valve 104, the spring 427 will cause the brake band to firmly grip the brake drum 65a, resulting in immediate stoppage of the machine. By insuring that the machine will be stopped immediately the air control valve 104 is actuated upon the occurrence of a jam, it will be impossible for the machine to overrun sufficiently to cause any breakage of either bottles or parts of the machine.

Figure 22:
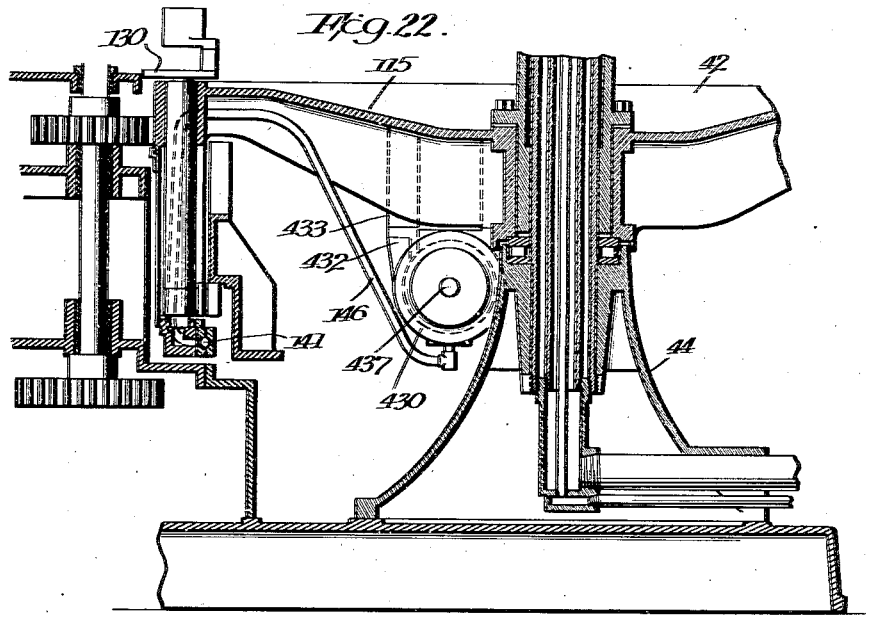
Figure 22 is a detail view, partly in vertical section, showing a modified arrangement for maintaining pressure beneath the bottle supporting platform.
Figure 23:
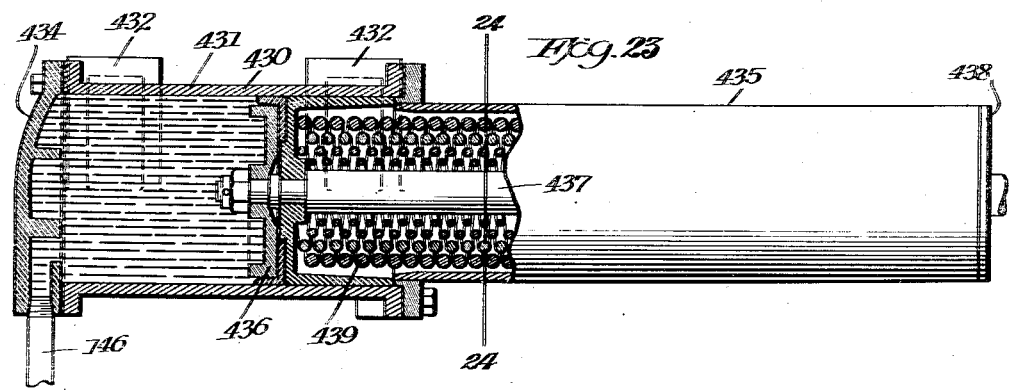
Figure 23 is a view, partly in central longitudinal section, of a reservoir for maintaining pressure in the system disclosed in Figure 22.
Figure 24:
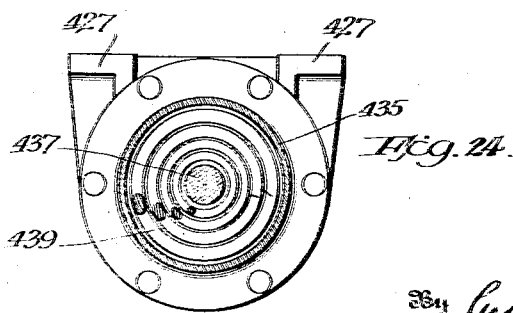
Figure 24 is a vertical sectional view on the line 24—24 of Figure 23.

Figures 22 to 24 show a modified structure for maintaining pressure in the chambers beneath the bottle supporting platforms 130. By the arrangement disclosed in these figures, a reservoir 430 is secured to the undersurface of the filling table 115, this reservoir communicating, through the pipe 146, with the manifold 141 through which pressure fluid is supplied to the lifting chambers. That is to say, the reservoir 430 would replace the reservoir 145 within the central structure of the filling table illustrated in Figures 2, 4 and 5.

The reservoir 430 comprises a cylinder 431 secured to the underside of the table 115 by bolts extending through lugs 432 on the cylinder and into a seat 433 on the underside of the table 115. The cylinder 431 is closed at one end by a cover plate 434 to which the inner end of the supply pipe 146 is secured, the other end of the cylinder 431 having a spring chamber 435 of cylindrical form bolted thereto. A piston 436 provided with suitable packing is positioned in the cylinder 431 and a guide rod or piston rod 437 extends from the rear face of the piston and through an aperture in the outer end wall 438 of spring chamber 435. One or more coil springs 439 are provided between the rear face of the piston 436 and the outer end 438 of the spring chamber, the spring structure tending to hold the piston 436 to the left as shown in Figure 23 and thereby hold the fluid in that end of the cylinder and in the system under pressure. In a platform lifting mechanism including the reservoir 430, oil or a similar liquid would preferably be used as the fluid pressure medium although air could of course be used. With the circuit filled with fluid, the spring structure 439 would be adjusted to hold the piston 436 in the proper position to maintain the fluid at the desired pressure. In every other respect, a system including the reservoir 430 would operate in the manner set forth above in connection with the structure and operation of the bottle supporting platforms.

*General summary of the operation of the machine*

The operation of each of the various mechanisms of the machine has been described in detail in connection with the description of the structure of each mechanism. To summarize, the operation of the entire machine is as follows:—

Empty incoming bottles are removed from the straight-line conveyor 47 by the infeed dial 49, the feeding of the bottles to the dial being controlled by the gate mechanism 87. In the event that the bottles should become jammed at this point, the mechanism 88 will actuate the air release control valve 104 to disengage the clutch 64 and set the brake device 67 to stop the machine.

Each bottle received by the infeed dial 49 will be placed upon one of the bottle supporting platforms 130 of the filling table 115, the bottle supporting platform being held in downward position by engagement of its roller 158 with cam 160 and against the action of the fluid in the chamber beneath the platform at that time. Immediately after a platform has received an empty bottle, the rotation of the filling table 115 will cause the roller 158 of that platform to move off the cam, so that the fluid pressure in the manifold 141 may move the platform upwardly. In the upward movement of the bottle, the outer surface of its mouth will first contact with the interior wall of the centering bell 184 provided above each bottle platform. Since the inner wall of the centering bell is upwardly and inwardly inclined, the mouth of the bottle will be aligned with the filling nozzle 183 to pass upwardly about this nozzle. The continued upward movement of the bottle supporting platform, by reason of the fluid pressure exerted in the chamber beneath the platform, will force the lip of the bottle into close contact with the inner wall of the centering bell, the upper surface of the centering bell contacting with the sealing ring 275 as shown in Figure 14 so that the bottle will be completely sealed with respect to the filling head.

The roller 158 of the platform will now pass beneath the release control lever 230 but because of the presence of a bottle upon the platform, the position of the lever 230 will not be changed and the counter-pressure trip 190 will remain in outward or extended position as shown in Figure 16, contacting with the offset portion 187 of the lower arm 185 formed integral with the filling head valve disc 182 to move the valve disc to counter-pressure position.

In the event that no bottle is positioned upon a platform 130 by the infeed dial 49, the bottle platform will rise to the full limit of its upward movement, raising the roller 158 somewhat higher than is the case when a bottle is positioned upon the platform and contacts with the filling head to thereby limit the upward movement of the platform. By rising to a greater extent than usual, the roller 158 will raise the outer end of the release control lever 230, depressing its inner end 234 and actuating the release control valve 233 to relieve the pressure in the counter-pressure trip cylinder 196 (Figure 12) to permit the spring 249 in this cylinder to move the trip inwardly so that the offset portion 187 of the lower valve arm 185 of that filling head will move past the trip without being actuated as shown in F in Figure 8. When the valve disc passes the counter-pressure trip 190 in this manner, i. e., without being moved from neutral or closed position, it will be subsequently moved beneath the filling trip 191 without being actuated and no beer will be wasted.

Assuming however, that a bottle is positioned upon the filling platform 130 and the valve disc corresponding to this platform has been moved to counter-pressure position, the offset portion of the lower valve arm 185 of that filling head will contact with the filling trip 191 and will be moved from counter-pressure position to filling position, aligning the passages of the filling head through which beer flows and also aligning the passages of the head through which air may return to the reservoir 121. This will result in the filling of the bottle with beer, the air present in the bottle being simultaneously returned to the reservoir.

Continued rotation of the filling table 115 will bring the upper valve arm 186 into contact with the neutral or closing trip 192 to close the passages of the filling head against flow.

The movement of the valve arm to neutral or closed position is intended to occur at a movement just subsequent to or almost simultaneous with the complete filling of the bottle with beer. Because of the fact that the filling trip 191 may be moved upon its bracket 206 and the closing trip 192 may be moved upon its bracket 213 relative to the path of movement of the filling table, the length of the filling stage may be adjusted. Ordinarily, the filling stage will be of such duration as to properly fill the bottles with beer in the manner set forth above, but since bottles of the same rated capacity vary in actual capacity, some of the bottles, that is, those of smaller capacity, may have a greater amount of beer flowed into them than is necessary. Any surplus beer moving into a bottle in this manner will move upwardly in the passages through which counter-pressure air has been flowing from the bottle. However, since the air relief passages are of relatively small diameter and because the beer can only flow upwardly through these passages to a point therein corresponding to the upper surface of the beer in the reservoir, no great amount of beer can be present in these passages at any time.

Upon the contact of the upper valve arm 186 of the filling head with the neutral or closing trip 192, further flow of beer into the bottle will be shut off and any beer which has moved up into the air passages will be retained in these passages.

Since a platform which does not have a bottle positioned on the same will have the upper valve arm 186 thereof already in neutral or closed position because of the fact that the disc has not been actuated by either the trip 190 or 191, the upper valve arm of such a filling head will move freely past the neutral or closing trip 192.

Immediately after a bottle platform has moved past the neutral or closing trip, the roller 158 of that platform will come in contact with the approach end of the cam track 160 and the movement of the roller along the downwardly inclined surface 161 of the cam track will cause the bottle supporting platform to be moved downwardly, breaking the seal between the bottle and filling head and opening the bottle to atmosphere. The downward movement of the platform will also force the air in the chamber beneath the platform into the manifold 141, this air pressure being distributed so that it will be effective upon the platform which is, at that moment, moving out of engagement with the exit or upwardly inclined end 162 of the cam track.

The downward movement of the platform will continue until its upper surface is brought flush with the surface of the work table 41, at which time the bottle upon the platform will be guided onto the work table and into one of the pockets of the outfeed dial 50 by the extension 91a of the guide plate 91 fixed to the work table.

The outfeed dial 50 will move the bottles about the same to the rotating crowning mechanism 43. Each bottle will be crowned in the usual manner by the crowning head with which it is aligned and will then move upon the outfeed end of the straightline conveyor 47 to be moved to a pasteurizing machine. If bottles become jammed at the outfeed end of the machine, the plate 96 will be moved to actuate air control valve 104, stopping the machine, as described above in connection with the mechanism 88.

In some instances, the straight-line conveyor 47 may extend only partially across the work table of the machine and a separate outfeed conveyor, driven from the pasteurizing machine, may be provided at the right-hand end of the work table 41 to conduct bottles to the pasteurizer.

It will be obvious from the above that our invention provides a filling machine as well as various mechanisms included therein which fulfill all of the stated objects of the invention and which are, in numerous other respects, marked improvements upon prior art machines and mechanisms.

It will be understood that the invention is not limited to the details of construction shown in the drawings and that the examples of the use of the machine and mechanisms which have been given do not include all of the uses of which they are capable and that the phraseology employed in the specification is for the purpose of description and not of limitation.

We claim:

1. The combination in a filling machine, of a moving filling table, said table being provided with a chamber, a bottle supporting platform reciprocable with respect to said chamber, cam means to engage said platform to move it to a predetermined position, and a source of compressible gaseous fluid under pressure constantly in communication with said chamber to move said platform to another position when out of engagement with said cam means.

2. The combination in a filling machine, of a moving filling table, said table being provided with an upwardly facing chambered member, a downwardly facing cylinder movable on the exterior of said chambered member, said cylinder carrying a bottle supporting platform, means engaged by said cylinder during a portion of its movement with said table to hold said platform in a predetermined position with respect to said chambered member, and a source of fluid constantly in communication with said chambered member to move said cylinder from said predetermined position when out of engagement with said means.

3. The combination in a filling machine, of a rotary table, a source of fluid pressure, said table being provided with a chambered member, a cylinder movable on the exterior of said chambered member, said cylinder carrying a bottle supporting platform, said source of pressure being continuously in communication with said chambered member to move said cylinder and platform to a predetermined position with respect to said chambered member, and means in the path of movement of said table to engage said cylinder and move it to another position with respect to said chambered member.

4. The combination in a filling machine, of a rotary table, a cylinder carried by said table, a bottle supporting platform including a piston having a depending sleeve reciprocable on said cylinder, a source of compressible gaseous fluid under pressure in constant communication with said cylinder to move said platform to a predetermined position with respect to said cylinder, and engaging means in the path of movement of said table to move said platform to another position with respect to said cylinder.

5. The combination in a filling machine, of a rotary table, an upstanding tube fixed to said table, a bottle supporting platform including a piston having a depending sleeve reciprocable on said tube, a source of fluid under pressure communicating with said tube to hold said platform upwardly, and engaging means in the path of movement of said table to move said platform downwardly with respect to said tube against the action of the fluid.

6. The combination in a filling machine, of a rotary table, a circular manifold carried by said filling table and containing fluid under pressure, a plurality of tubes communicating with said manifold, bottle supporting platforms including cup-shaped pistons reciprocally mounted on said tubes, and means to move said pistons downwardly with respect to said tubes during a portion of their movement with said filling table and against the action of the fluid.

7. The combination in a filling machine, of a rotary filling table, a plurality of upwardly facing tubular members below and moving with said table, said table being provided with bearing apertures respectively aligned with said tubular members, downwardly facing cylinders reciprocable in the bearing apertures and on said tubular members, a fixed cam to draw said cylinders down upon said tubular members, a source of fluid pressure constantly in communication with said tubular members to urge said cylinders upwardly, and bottle supporting platforms on the upper ends of said cylinders, each of said platforms being of sufficient area in a horizontal plane that its edges will project substantially beyond the corresponding bearing aperture and the surface of the corresponding cylinder.

8. The combination in a filling machine, of a rotary filling table, a plurality of upwardly facing tubular members below and moving with said table, said table being provided with bearing apertures respectively aligned with said tubular members, downwardly facing cylinders reciprocable in the bearing apertures and on said tubular members, a fixed cam to draw said cylinders down upon said tubular members, a source of fluid pressure constantly in communication with said tubular members to urge said cylinders upwardly, bottle supporting platforms on the upper ends of said cylinders, a boss on the upper surface of the table surrounding each bearing aperture, the upper surface of the boss being downwardly inclined from the aperture to direct liquid away from the aperture.

9. A filling head including a nozzle adapted to be inserted in a bottle, said nozzle having a passage associated therewith for flow of liquid into a bottle, the mouth of said passage being arranged to direct the liquid against the inner wall of the upper portion of the bottle in a direction substantially tangential with respect to said wall to cause the liquid to flow downwardly upon the wall of the bottle.

10. A filling head including a nozzle adapted to be inserted in a bottle, said nozzle having a passage associated therewith for flow of liquid into a bottle, the mouth of said passage being arranged to direct the liquid against the inner wall of the upper portion of the bottle in a substantially horizontal plane and in a direction substantially tangential with respect to said wall to cause the liquid to flow downwardly upon the wall of the bottle.

11. A filling head including a nozzle adapted to be inserted in a bottle, said nozzle having a passage associated therewith for flow of liquid into a bottle, the mouth of said passage being arranged to direct the liquid against the inner wall of the upper portion of the bottle in a substantially horizontal direction to cause the liquid to move downwardly upon the wall of the bottle.

12. A filling head including a nozzle adapted to be inserted in a bottle, said nozzle having a passage associated therewith for flow of liquid into a bottle, said passage being spiralled about a substantially vertical axis and arranged to have the mouth thereof positioned adjacent the inner wall of the mouth of the bottle to cause liquid issuing therefrom to move downwardly into the bottle along the wall of the latter.

13. The combination in a filling head for filling machines, of a valve body and a valve disc, said body having a resilient seat face upon which the valve disc moves, said valve body and valve disc having passages therein adapted to be aligned to permit flow of fluid therethrough, said seat face being provided with a non-resilient portion with which the mouth of the valve disc passage is adapted to be aligned when out of alignment with the valve body passage.

14. The combination in a filling head for filling machines, of a valve body, said valve body having a fluid passage therein adapted to communicate with a reservoir and leading to one face of the valve body, a filling nozzle on the filling head, the valve body having a second passage leading from said face to the filling nozzle, a valve mounted upon said face of the valve body and having a passage therein adapted, upon movement of the valve, to bridge the respective passages in the valve body to permit flow through said passages, said valve body face being provided with a resilient gasket, and a non-resilient insert in said gasket at a point corresponding to the position of a mouth of the passage in said valve when such mouth is not in alignment with a passage in said valve body.

15. The combination in a filling machine, of a filling head having a passage therein, a valve in said passage to regulate fluid flow therethrough, means to periodically operate said valve, and a manually operable valve in said passage for opening said passage to atmosphere to vent fluid therefrom.

16. The combination in a filling machine having a base and a reservoir for fluid, of a plurality of filling heads rotatable with respect to said base, each head including a valve body, said valve body being provided with a passage for fluid flow communicating with the reservoir and leading to one face of the valve body, a filling nozzle on the filling head adapted to be positioned in a container, said valve body having a second passage leading from said face of the valve body to the filling nozzle, a valve mounted upon said face of the valve body and having a passage therein adapted upon movement of said valve to bridge said passages in the valve body to permit fluid flow therethrough, means in the path of movement of said filling heads to operate said valves, and a manually operable valve in one of the passages of each filling head to place such passage in communication with the atmosphere to vent fluid therefrom.

17. The combination in a filling machine having a reservoir for fluid, of a filling head including a valve body, said valve body being provided with a pair of passages for fluid flow communicating with the reservoir and leading to one face of the valve body, a filling nozzle on the valve body adapted to be positioned in a container, said valve body having a second pair of passages leading from said face thereof to the filling nozzle, a valve mounted upon said face of the valve body and having passages therein adapted to be aligned with the passages of said pairs of passages in the valve body to permit fluid to flow from the reservoir to the container through one of the aligned passages and to permit fluid to flow from the container to the reservoir by the other aligned passage, and a valve in the latter aligned passage operable to place said passage in communication with the atmosphere to vent fluid therefrom.

18. The combination in a filling machine including a rotating filling table provided with filling valves, of trip means spaced about the path of rotary movement of said table to actuate said filling valves, and a horizontally extending supporting member for each of said trip members, said supporting members being provided with apertures spaced along the path of movement of said filling table to permit said trip members to be selectively positioned therein, said trip members being rotatable with respect to said supporting members upon contact therewith of a jammed filling valve.

19. The combination in a filling machine, of a moving filling head, a filling valve on the filling head, a vertically movable bottle platform beneath the head, engaging means carried by the platform on the side thereof opposite from said filling valve, valve trips spaced along the path of travel of the filling head and adapted to successively contact the valve, means to move the bottle platform to a predetermined position when a bottle is carried thereby, said last-named means being adapted to move the platform to a second position when no bottle is carried by the platform, and means actuated by said engaging means when the platform is in the second position to render one of said valve trips inoperative, the succeeding valve trips being so positioned that they will fail to contact with the filling valve when it is not operated by said inoperative trip.

20. The combination in a filling machine including a moving filling head, a filling valve on the filling head, a bottle platform and actuating means for the filling valve, of means to render said actuating means inoperative when no bottle is positioned on the platform, comprising a source of fluid pressure normally connected to said actuating means by a pressure circuit and a valve device in said pressure circuit adapted to be tripped by a platform when the latter carries no bottle, said valve device including a valve casing provided with oppositely facing valve seats and a valve element including a pair of rigidly connected valves adapted to alternately control said respective seats, said valve being connected to said source of fluid at one end of said casing and at a point beyond said valve seats and connected to said actuating means at a point between said seats to permit pressure flow to the latter when said valve element is positioned out of contact with the adjacent seat, and a vent at the opposite end of said valve casing and beyond said seats and adapted to be placed in communication with said actuating means when the valve device is tripped by an empty platform.

ROBERT J. STEWART.
WILTIE I. GLADFELTER.